United States Patent [19]

Mayer et al.

[11] Patent Number: 5,303,364
[45] Date of Patent: Apr. 12, 1994

[54] PAGED MEMORY CONTROLLER

[75] Inventors: Dale J. Mayer, Houston; Paul R. Culley, Cypress; Mark Taylor, Houston, all of Tex.

[73] Assignee: Compaq Computer Corp., Houston, Tex.

[21] Appl. No.: 999,677

[22] Filed: Dec. 30, 1992

Related U.S. Application Data

[63] Continuation of Ser. No. 431,670, Nov. 3, 1989.

[30] Foreign Application Priority Data

Sep. 29, 1989 [CH] Switzerland .................. 614861

[51] Int. Cl.$^5$ .................. G06F 12/00; G06F 13/00
[52] U.S. Cl. .................. 395/425; 395/400; 364/238.4; 364/DIG. 1; 364/240.2; 364/243.41
[58] Field of Search .................. 395/400, 425; 364/200 MS, 900 MS, 238.4; 365/189.02, 205

[56] References Cited

U.S. PATENT DOCUMENTS

| | | | |
|---|---|---|---|
| 4,484,308 | 11/1984 | Lewandowski et al. | 395/250 |
| 4,581,721 | 4/1986 | Gunawardana | 364/200 |
| 4,621,320 | 11/1986 | Holste et al. | 364/200 |
| 4,796,231 | 1/1989 | Pinkham | 365/189 |
| 4,872,138 | 10/1989 | Ciacci | 365/49 |
| 4,899,275 | 2/1990 | Sachs et al. | 364/200 |
| 4,933,910 | 6/1990 | Olson et al. | 365/238.5 |
| 4,939,641 | 7/1990 | Schwartz et al. | 364/200 |
| 4,943,944 | 7/1990 | Sakui et al. | 365/189.05 |
| 4,954,951 | 9/1990 | Hyatt | 395/425 |
| 4,984,209 | 1/1991 | Rajaram et al. | 365/222 |
| 4,989,182 | 1/1991 | Mochizuki et al. | 365/210 |
| 5,005,118 | 2/1991 | Lenoski | 364/200 |
| 5,019,965 | 5/1991 | Webb, Jr. et al. | 364/200 |
| 5,034,917 | 7/1991 | Bland et al. | 365/900 |
| 5,065,312 | 11/1991 | Bruckert et al. | 395/575 |
| 5,111,386 | 5/1992 | Fujishima et al. | 395/425 |

FOREIGN PATENT DOCUMENTS

| | | |
|---|---|---|
| 0232526 | 12/1986 | European Pat. Off. |
| 0293720 | 5/1988 | European Pat. Off. |
| 2217066A | 10/1989 | United Kingdom |

OTHER PUBLICATIONS

Compaq Deskpro 386 Technical Reference Guide, vol. 1, May, 1987, pp. 2-4, 2-5, 2-103 to 2-131, 3-2, 3-3, and 3-26 to 35.
Compaq Deskpro 386s Technical Reference Guide, vol. 1, Aug., 1988, pp. 4-2, 4-3, and 4-28 to 4-29.
S. Gumm & C. Dreher, Unraveling the Intricacies of Dynamic RAMS, Electronic Design News, Mar. 30, 1989, pp. 155-164.
R. Wawrzynek, "Tailor Memory-System Architecture for Your Chosen DRAM", Electronic Design News, Apr. 13, 1989, pp. 157-164.
R. Adamas & G. Scavone, "Design a DRAM Controller from the Topdown", Electronic Design News, Apr. 27, 1989, pp. 183-188.
F. Tabaian & M. Toomer, "Attention to Layout Details Facilities DRAM-Board Design", Electronic Design News, May 11, 1989, pp. 179-186.
P. Culley, Compaq Corp., Internal Drawing of D4-Page DRAM Timing, Rev. A & B, Sep. 15, 1986 and Sep. 18, 1987.

*Primary Examiner*—Alyssa H. Bowler
*Assistant Examiner*—Frank J. Asta
*Attorney, Agent, or Firm*—Pravel, Hewitt, Kimball & Krieger

[57] ABSTRACT

A computer system has a processor coupled to a cache controller, uses page mode memory devices and performs page hit detection on the processor local bus. Column address and data values are latched by a memory controller on memory write operations to allow early completion of the cycle so that the next cycle can partially overlap. This allows the use of economical memories and yet have zero wait state page hit operation.

20 Claims, 17 Drawing Sheets

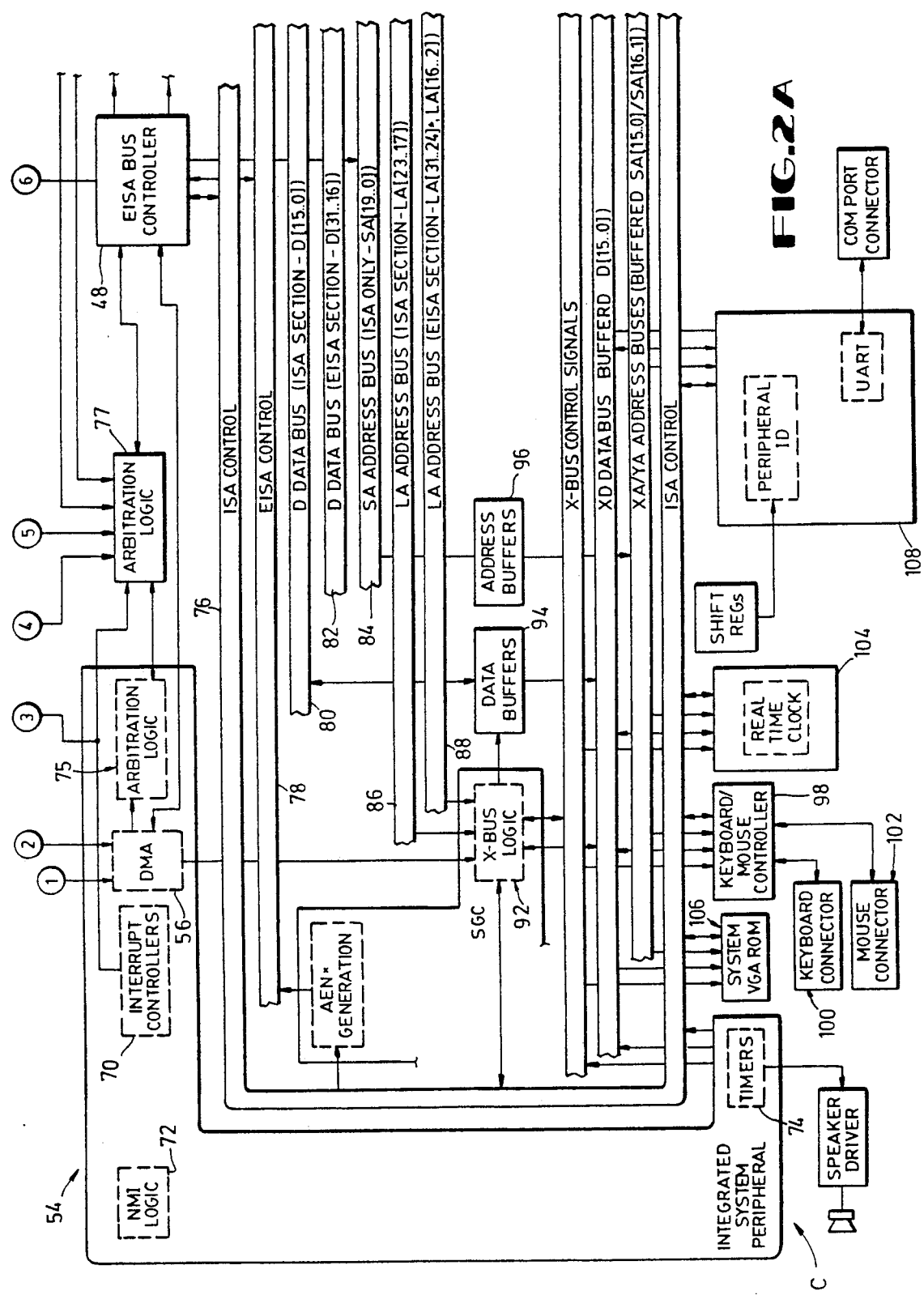

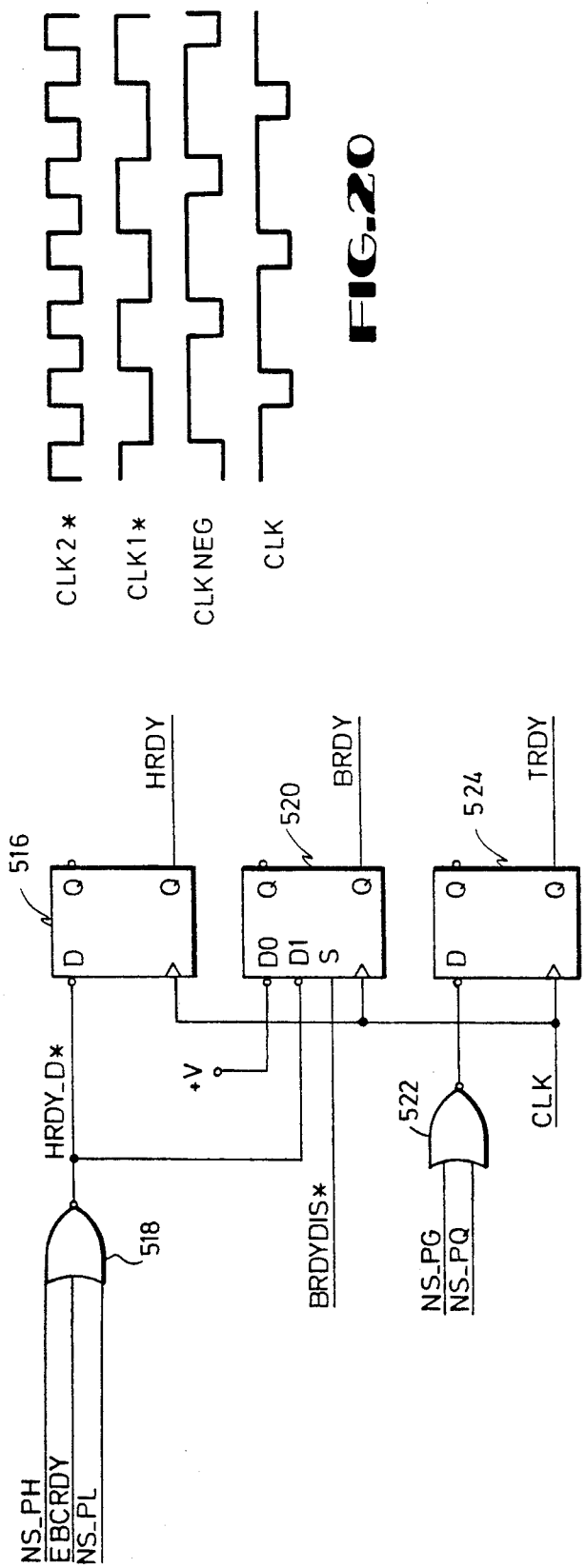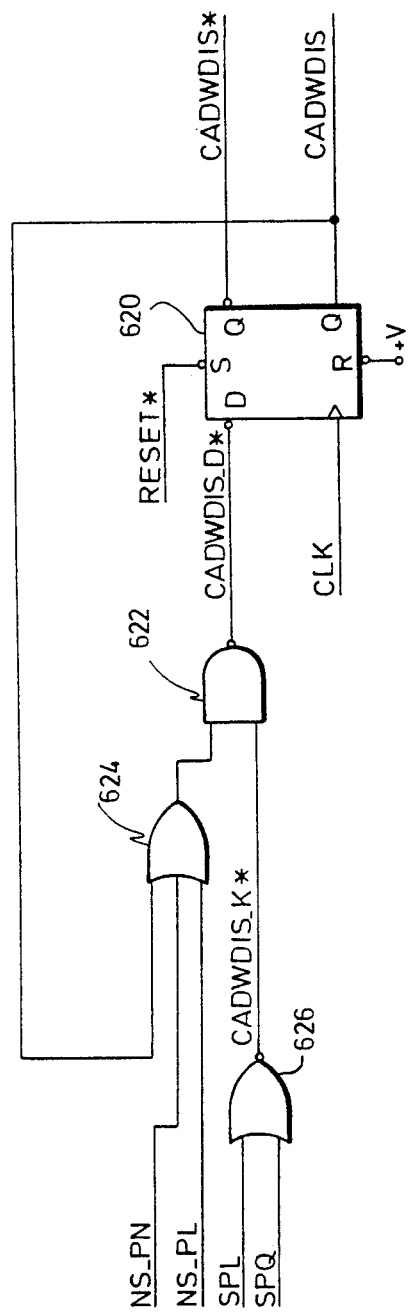

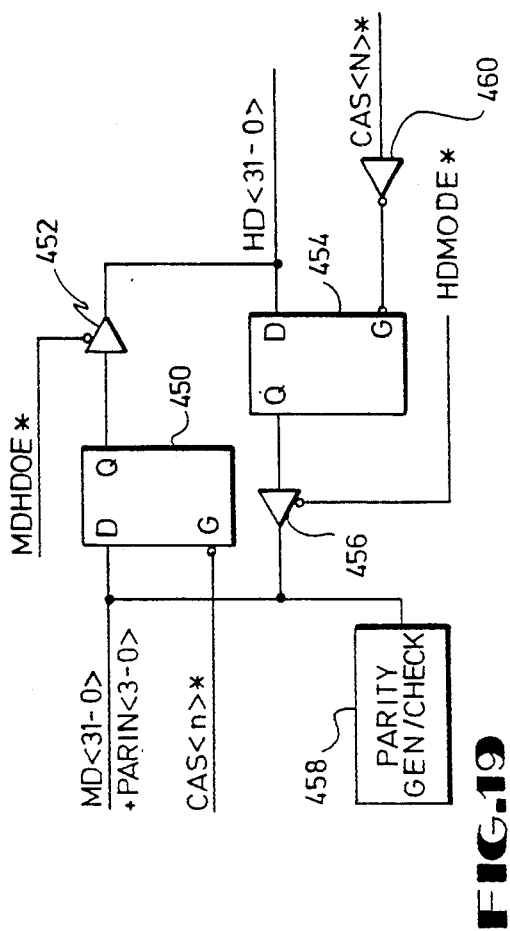
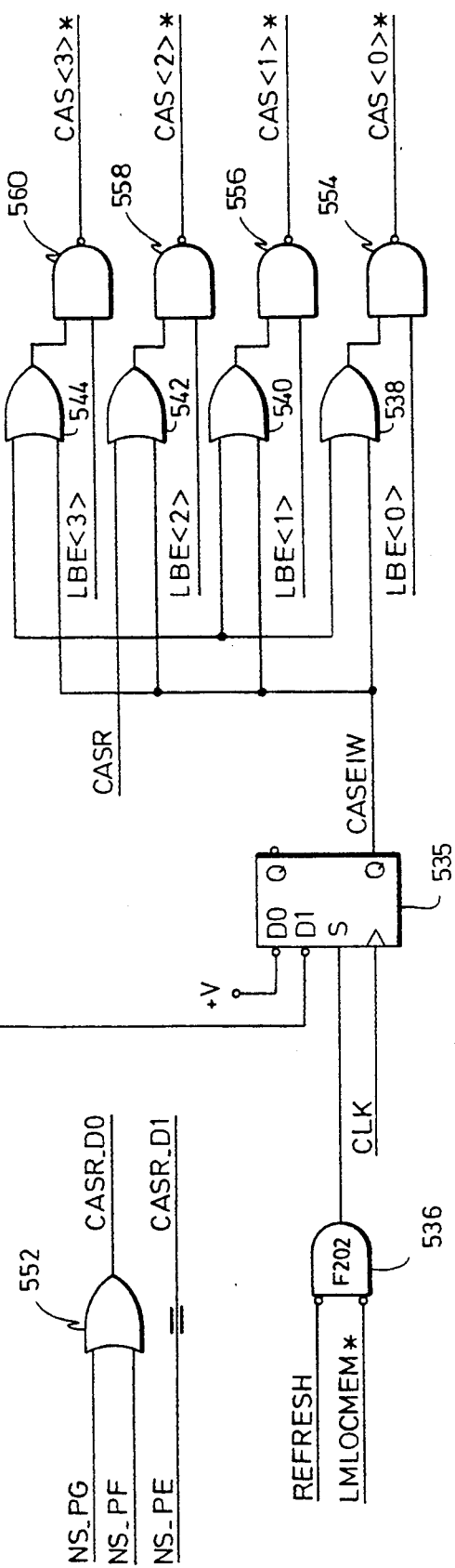
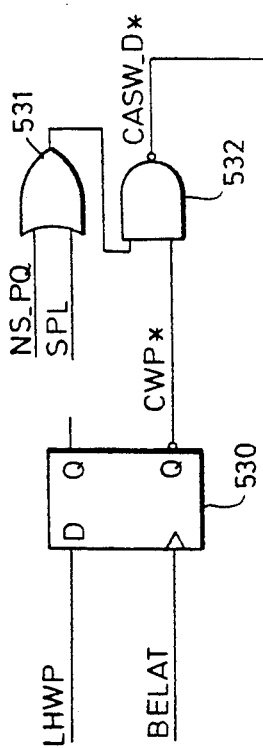

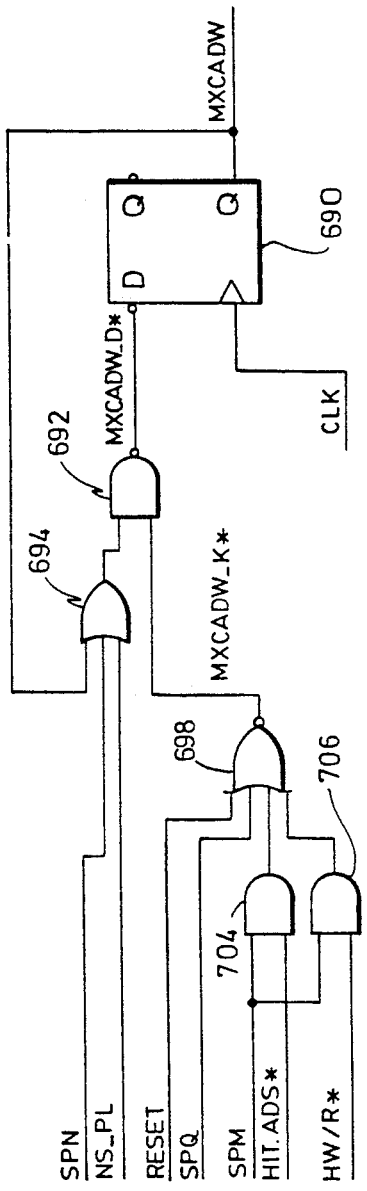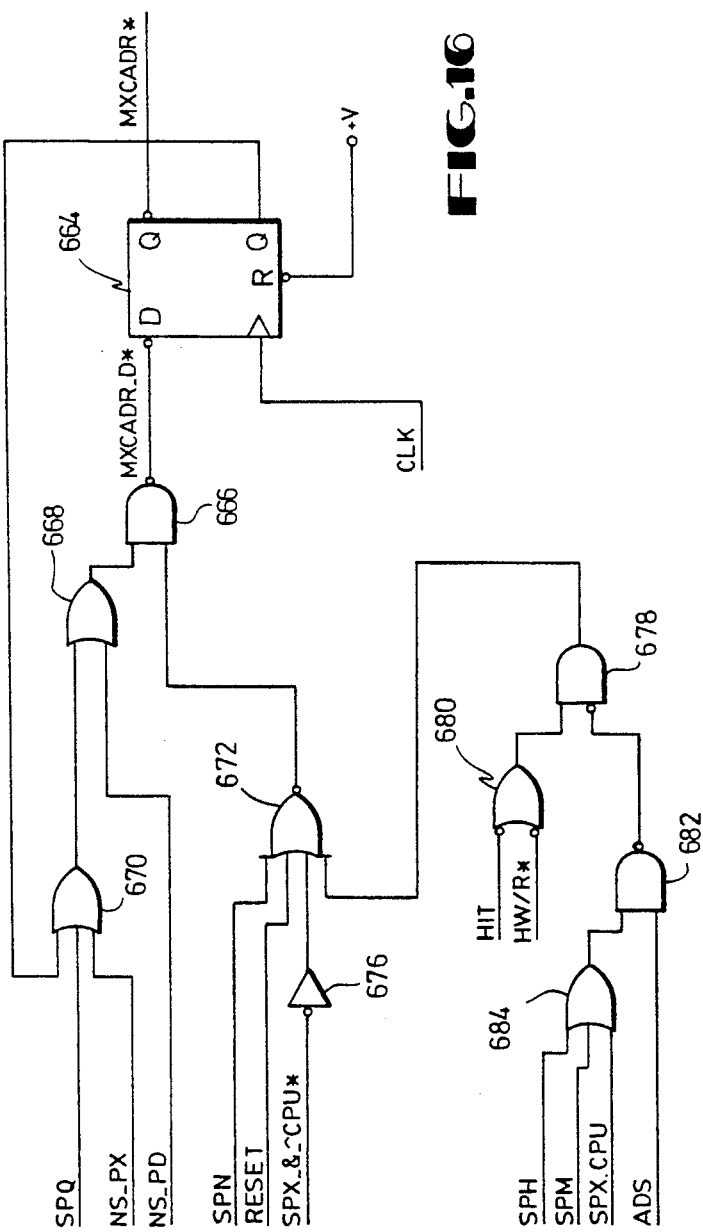
FIG. 17
FIG. 16

PAGED MEMORY CONTROLLER

This is a continuation of co-pending application Ser. No. 431,670 filed on Nov. 3, 1989.

BACKGROUND OF THE INVENTION

1. Field of the Invention

The invention relates to computer systems using dynamic random access memories and more particularly to computer systems using page mode operation dynamic random access memories.

2. Discussion of the Related Art

Personal computer systems having been getting faster and more powerful at a rapid rate and yet more speed and power is always being demanded. To this end 32 bit microprocessors with even higher clock rates have been employed. However, processor speed has readily outstripped the speed of economical memory devices. To run many current processors without wait states requires 25 nsec memories. These memory devices are prohibitively expensive to be used as the main system memory, so two avenues are available.

The first possibility is to use the fastest, economically feasible memory devices in the main system memory and just bear the performance loss, hoping that other considerations are more important. Operating the memory devices in page mode where only a column address needs to be supplied if the row address is the same as the previous access, referred to as a page hit, improves the situation, but generally not enough to meet demands. The second avenue available is the use of a cache memory system which uses a small amount of high speed, zero wait state memory which contains a copy of portions of the data stored in the main memory. By properly sizing and organizing the cache memory, in excess of 90% of the memory accesses can be run out of the cache memory, this percentage being referred to as the hit ratio. The slower main memory is accessed only when the data is not in the cache, which is called a miss operation. The use of a cache memory system allows more economical memory devices to be used for main memory because the speed factor is not as critical because of the lower percentage of accesses to the main memory.

Even the improvement provided by using cache memory has not been sufficient to meet performance demands. The cache memory systems used in personal computers generally resulted in the location of the main memory on a bus separated from the processor, which resulted in delays of operation relative to a system not having this additional bus when access had to be made to the main memory in cache miss instances. Page mode main memory device operation has been combined with a cache memory system to improve the performance during cache miss cycles, but this still resulted in the inclusion of wait states in accesses to main memory, generally two wait states in page hit cases.

SUMMARY OF THE INVENTION

A computer system incorporating the present invention reduces the number of wait states required on cache miss, page hit cycles to increase system performance. The address comparisons utilized in determining if a memory page hit is occurring are based on the address signals provided directly by the processor, not those presented on a bus isolated from the processor. This saves one processor clock cycle on page hit write cycles by allowing early generation of the ready signal to the cache controller and processor. Additionally, the column addresses and data are stored so that a memory write cycle can be terminated to the processor one processor clock cycle sooner than would be possible if the signals were only buffered. Using appropriate memory devices, which are relatively economical, zero wait state write cycle page hits are performed.

When the computer system includes a write through cache memory system, the system performance increases markedly because in write through cache memory systems the majority of main memory accesses are write operations. Thus the reduced number of wait states has a greater than expected impact on system performance based merely on the number of read versus write operations performed by the microprocessor and the hit ratio.

BRIEF DESCRIPTION OF THE FIGURES

A better understanding of the present invention can be obtained when the following detailed description of the preferred embodiment is considered in conjunction with the following drawings, in which:

FIGS. 1a and 1b and 2a and 2b are schematic block diagrams of a computer system incorporating the present invention;

FIG. 6 is a schematic block diagram of the page hit detector of FIG. 1a;

FIG. 7 is block diagram of portions of the host memory controller of FIG. 1a;

FIGS. 9-18 are schematic diagrams of portions of the circuitry of the host memory controller of FIG. 7;

FIG. 19 is a schematic block diagram of the data buffer of FIG. 1a; and

FIG. 20 is a timing diagram of the clocking signals used by the circuitry of FIGS. 9-18.

DETAILED DESCRIPTION OF THE PREFERRED EMBODIMENT

Figure 1A:
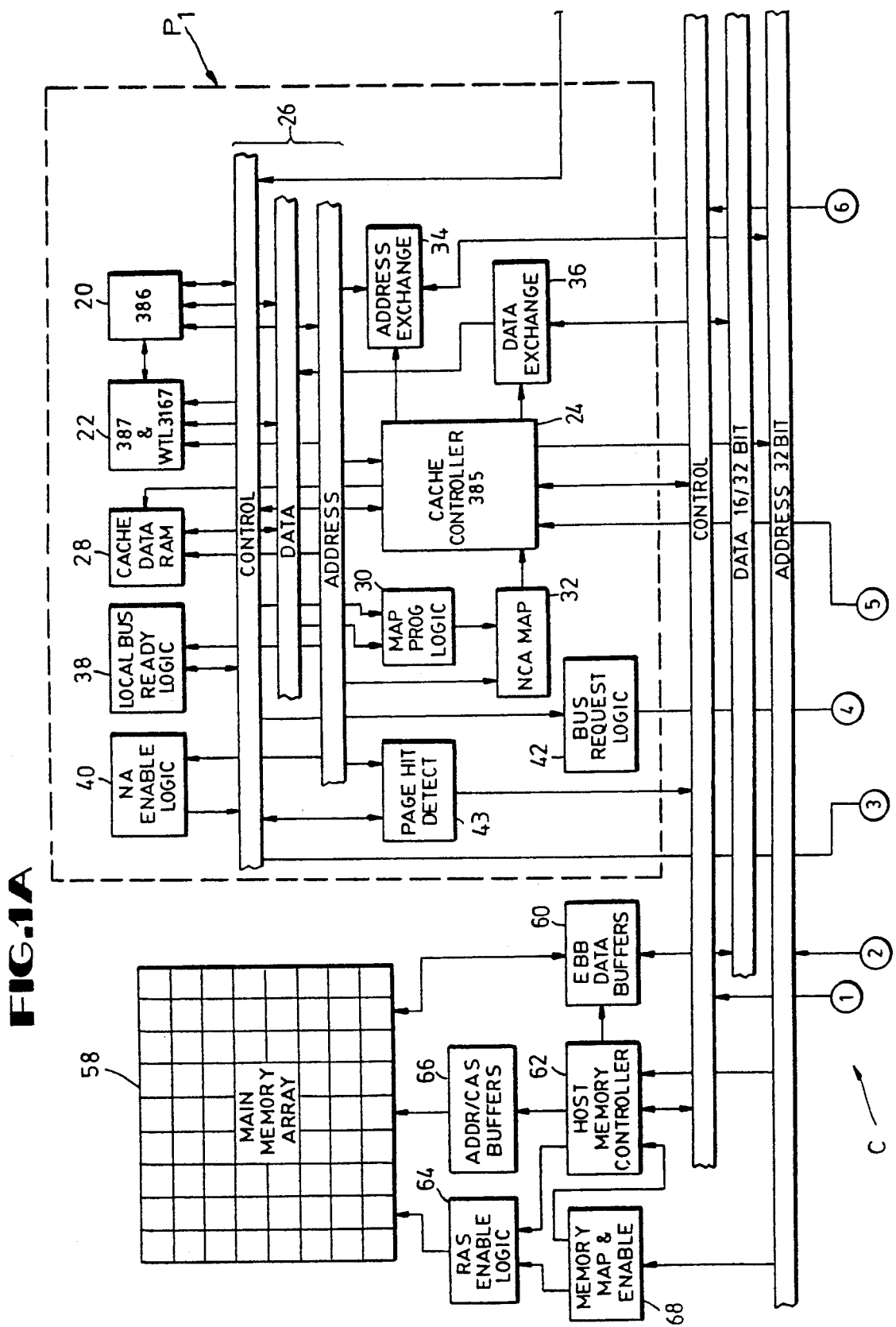
Figure 1B:
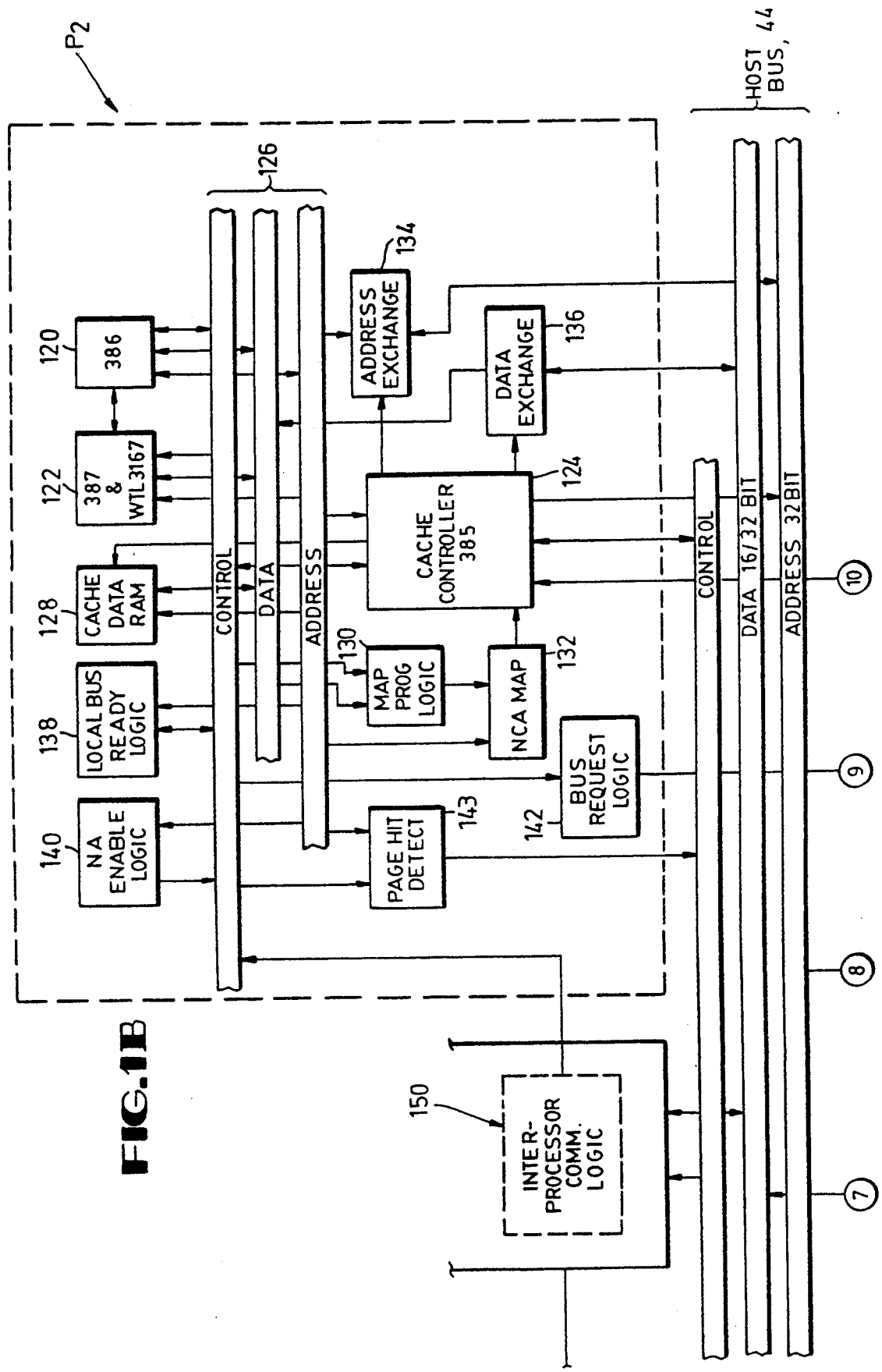

Referring now to FIGS. 1a, 1b, 2a and 2b, the letter C designates generally a computer system incorporating the present invention. For clarity, system C is shown in two portions, with the interconnections between FIGS. 1 and 2 designated by reference to the circled numbers one to ten. System C is comprised of a number of block elements interconnected via a plurality of buses. Throughout this specification, signal mnemonics with an asterisk following the signal descriptors indicates the signal is active at a logic low level and is the inverse of the signal descriptor without the asterisk. Signal mnemonics having numbers or ranges between angled brackets refer to those particular bits or positions a bus.

In FIGS. 1a, 1b, 2a and 2b a computer system is depicted. A processing unit P1 comprises a processor 20, a numerical coprocessor 22 and a cache memory controller 24 and associated logic circuits connected to a local processor bus 26. Associated with cache controller 24 is high speed cache data random access memory 28, noncacheable memory address map programming logic circuitry 30, noncacheable address memory 32, address exchange latch circuitry 34 and data exchange transceiver 36. Associated with the processor unit P1 also are local bus ready logic circuit 38, next address enable logic circuit 40 and bus request logic circuit 42.

The processor 20 is preferably an Intel 80386 microprocessor. The processor 20 has its control, address and data lines interfaced to the local processor bus 26. The coprocessor 22 is preferably an Intel 80387 and/or Weitek WTL 3167 numeric coprocessor interfacing with the local processor bus 26 and the processor 20 in the conventional manner. The cache ram 28 is preferably suitable high-speed static random access memory which interfaces with the address and data elements of bus 26 under control of the cache controller 24 to carry out required cache memory operations. The cache controller 24 is preferably an Intel 82385 cache controller configured to operate in two-way set associative master mode. In the preferred embodiment the components are the 33 MHz versions of the respective units. Address latch circuitry 34 and data transceiver 36 interface the cache controller 24 with the processor 20 and provide a local bus interface between the local processor bus 26 and a host bus 44, according to conventional practice in an 80386 and 82385 based system.

Circuit 38 is a logic circuit which provides a bus ready signal to control access to the local bus 26 and indicate when the next cycle can begin. The enable circuit 40 is utilized to indicate that the next address of data or code to be utilized by subsystem elements in pipelined address mode can be placed on the local bus 26.

Noncacheable memory address map programmer 30 cooperates with the processor 20 and the noncacheable address memory 32 to map noncacheable memory locations. The noncacheable address memory 32 is utilized to designate areas of system memory that are noncacheable to avoid many types of cache memory incoherency. The bus request logic circuit 42 is utilized by the processor 20 and associated elements to request access to the host bus 44 in situations such as when requested data is not located in the cache memory 28 and access to system memory is required. A page hit detector 43 is connected to the local processor bus 26 to allow the earliest possible determination of whether a cache miss cycle will be a memory page hit. The operation of the page hit detector 43 will be explained in more detail.

Figure 2B:
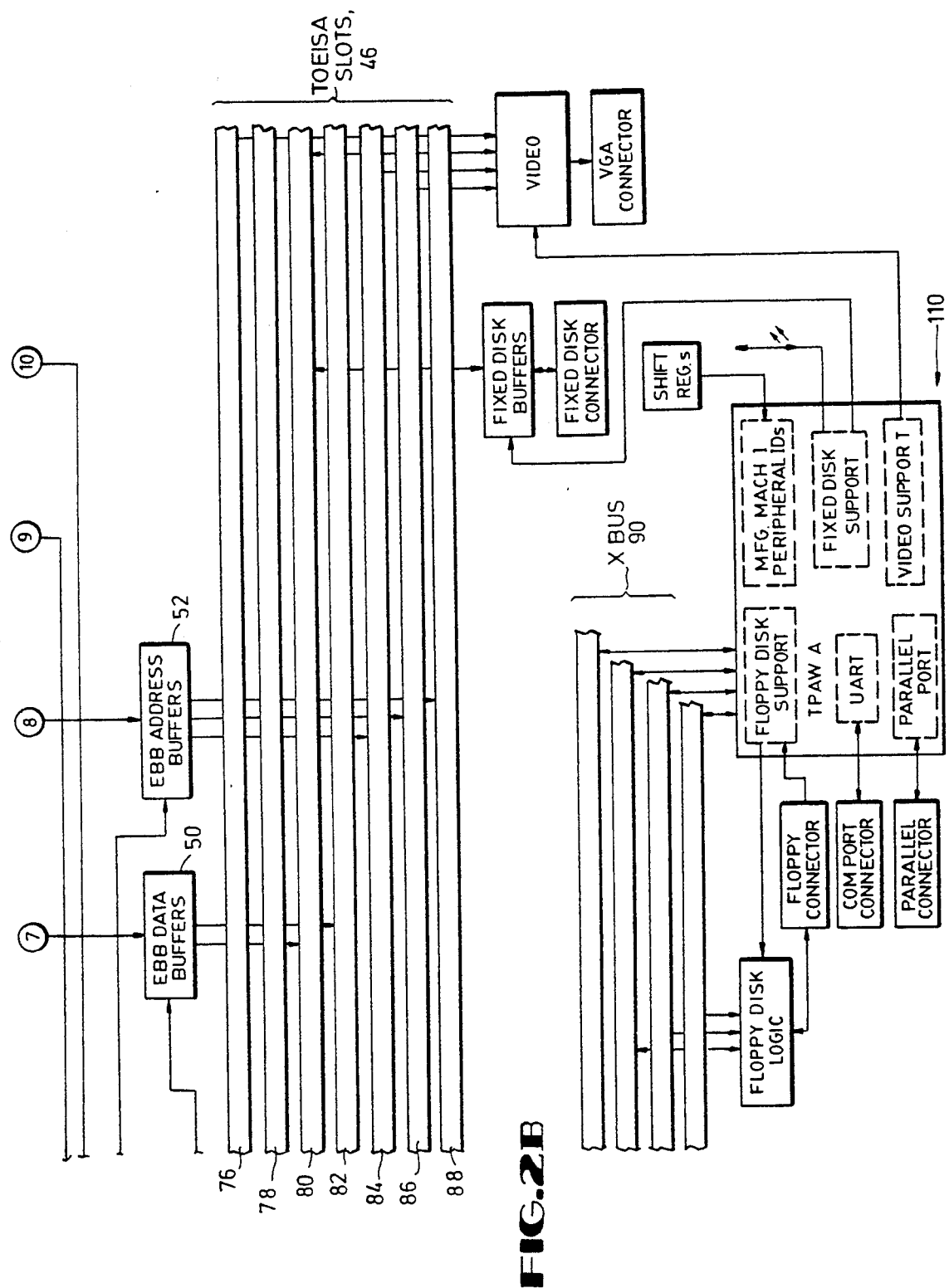

In the drawings, system C is configured having the processor bus 26, the host bus 44, a extended industry standard architecture (EISA) bus 46 (FIGS. 2a and 2b) and an X bus 90. The details of the portion of the system illustrated in FIGS. 2a and 2b and not discussed in detail below are not significant to the present invention other than to illustrate an example of a fully configured computer system. The EISA specification Version 3.1 is provided in U.S. Pat. No. 5,101,492 filed Sept. 3, 1989, issued Mar. 31, 1992, and entitled "Data Redundancy and Recovery Protection" by Schultz, et al., and fully explained the requirements of an EISA system and is hereby incorporated by reference. The portion of system C illustrated in FIGS. 2a and 2b is essentially a configured EISA system which includes the necessary EISA bus 46, an EISA bus controller 48, data latches and transceivers 50 and address latches and buffers 52 to interface between the EISA bus 46 and the host bus 44. Also illustrated in FIG. 2a an integrated system peripheral 54, which incorporates a number of the elements used in an EISA-based computer system.

The integrated system peripheral (ISP) 54 includes a direct memory access controller 56 for controlling access to main memory 58 (FIG. 1a) or memory contained in EISA slots and input/output (I/0) locations without the need for access to the processor 20. The main memory array 58 is considered to be local memory and comprises a memory circuit array of size suitable to accommodate the particular requirements of the system. The ISP 54 also includes interrupt controllers 70, nonmaskable interrupt logic 72 and system timers 74 which allow control of interrupt signals and generate necessary timing signals and wait states in a manner according to the EISA specification and conventional practice. In the preferred embodiment, processor generated interrupt requests are controlled via dual interrupt control circuits emulating and extending conventional Intel 8259 interrupt controllers. The ISP 54 also includes bus arbitration logic 75 which, in cooperation with the bus controller 48 and overall arbitration logic 77, controls and arbitrates among the various requests for the EISA bus 46 by the cache controller 24, the DMA controller 56 and bus master devices located on the EISA bus 46.

The main memory array 58 is preferably 80 nsec page mode dynamic random access memory. Memory 58 interfaces with the host bus 44 via a data buffer circuit 60, a memory controller circuit 62 and a memory mapping and enable circuitry 68. The buffer 60 performs data transceiving and parity generating and checking functions. The memory controller 62 and the memory mapping circuitry 68 interface with the memory 58 via address multiplexer and column address strobe buffers 66 and row address enable logic circuit 64. The memory controller 62 also receives a signal from the page hit detector 43 to control operation. The memory controller 62 will be described in more detail.

The EISA bus 46 includes ISA and EISA control buses 76 and 78, ISA and EISA data buses 80 and 82 and address buses 84, 86 and 88. System peripherals are interfaced via the X bus 90 in combination with the ISA control bus 76 from the EISA bus 46. Control and data-/address transfer for the X bus 90 are facilitated by X bus control logic 92, data transceivers 94 and address latches 96.

Attached to the X bus 90 are various peripheral devices such as keyboard/mouse controller 98 which interfaces the X bus 90 with a suitable keyboard and mouse via connectors 100 and 102, respectively. Also attached to the X bus 90 are read only memory circuits 106 which contain basic operations software for the system C and for system video operations. A serial communications port 108 is also connected to the system C via the X bus 90. Floppy and fixed disk support, a parallel port, a second serial port, and video support circuits are provided in block circuit 110.

In the preferred embodiment two similar processor units P1 and P2 can be located on the host bus 44. Processor unit P2 is similar to processor unit P1, with like circuits having the same reference number plus 100. The overall arbitration logic 77 is adapted for use with the two processor units P1 and P2 and arbitrates between the two processor units P1 and P2 to share the CPU arbitration location provided in the EISA specification. To allow interaction between the two processor units P1 and P2, interprocessor communication logic 150 is connected to the host bus 44 and to the processor units P1 and P2.

In general in this specification, a signal name having a first letter of P refers to a signal generally on the local bus 26, with a signal having a first letter of H represents that version of the signal generally on the host bus 44 and a signal having a first letter of M generally represents the version of that signal relating to the memory interface.

Figure 3:
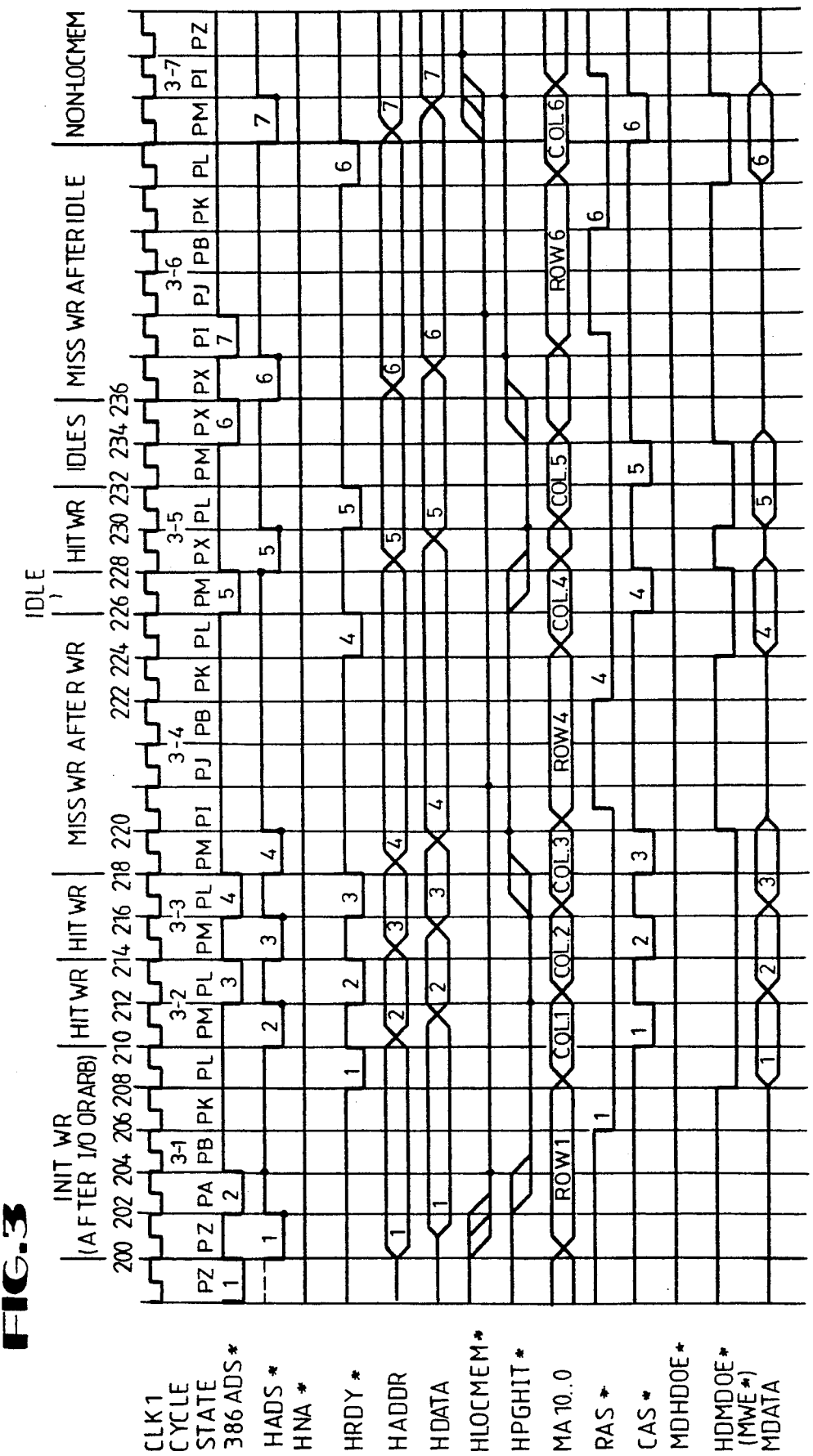
FIGS. 3-5 are timing diagrams of the present invention.
Figure 4:
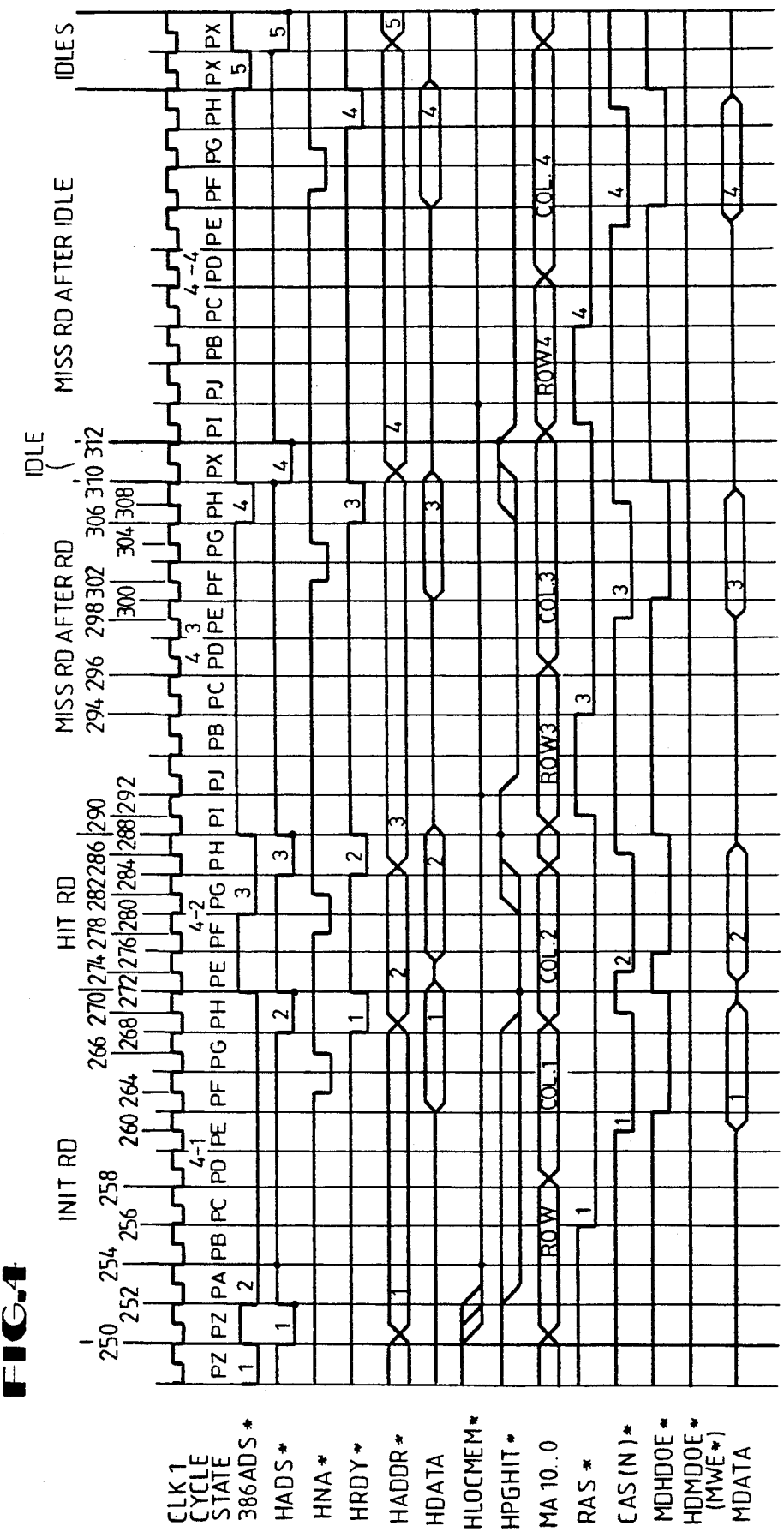
Figure 5:
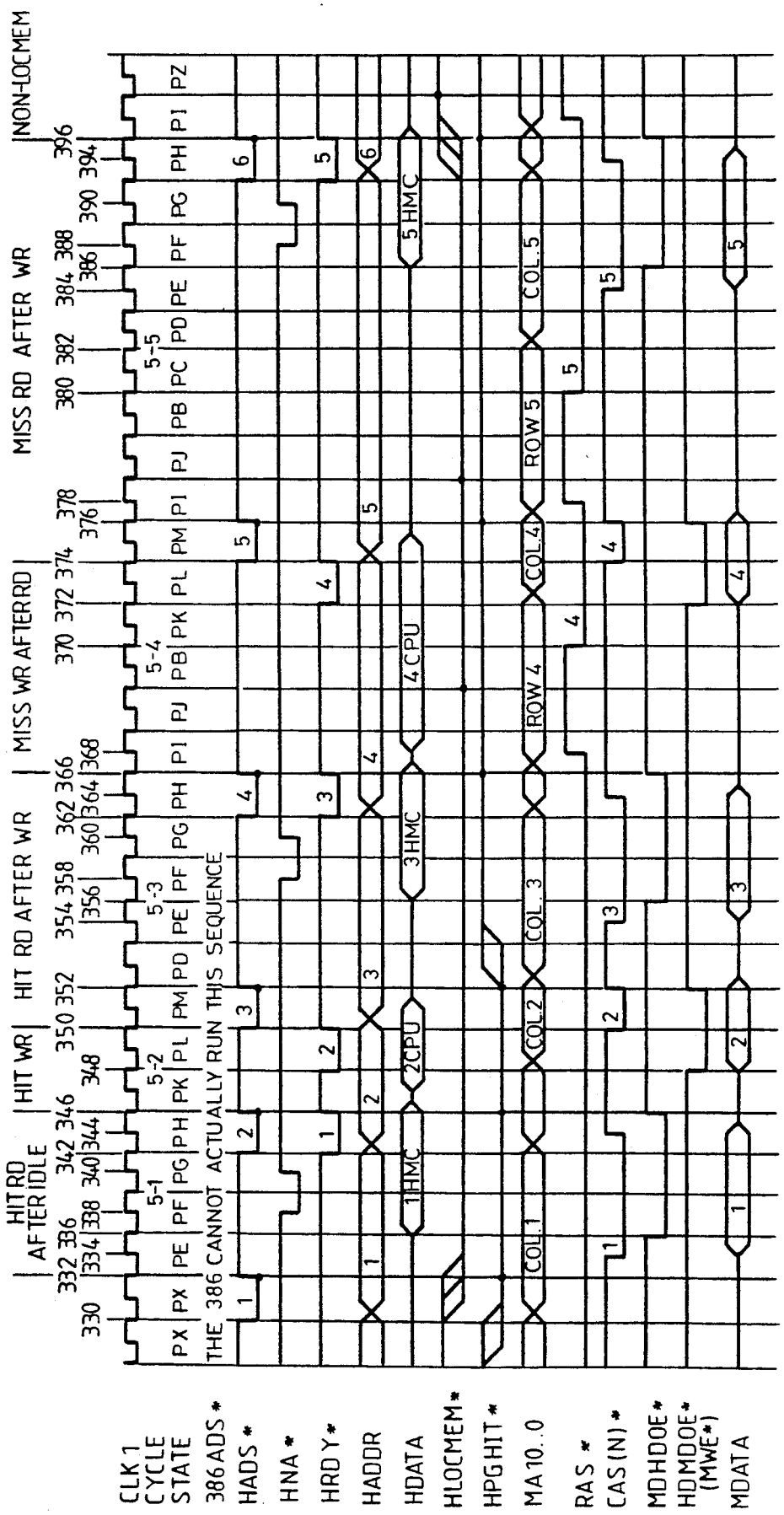

FIGS. 3, 4 and 5 illustrate the timing of the present invention under certain conditions, showing that page hit write operations are zero wait state operations while page hit read operations are two wait state operations. Page miss write operations are generally either five or six cycles, which corresponds to three or four wait states, and page miss read operations are nine or ten clock cycles, corresponding to seven or eight wait states. The various timings illustrated are exemplary and variations based on the responses of particular devices, such as the processor 20, are assumed.

Familiarity with the 80386 and 82385 signals and their timings will be presumed. Reference should be made to the Intel Corporation Microprocessor and Peripheral Handbook Volume 1 for the signals and timings relating to the 80386 and 82385. At time 200, a falling edge of the CLK1 signal, which is the synchronized clock signal used by the processor 20, the 386ADS* signal goes high indicating the completion of the valid presentation of the bus cycle definition and address signals. Also at this time the HADS* signal, which is provided by the 82385 cache controller 24 to the host bus 44 to indicate that valid addresses and bus cycle definition signals are present on the host bus 44, goes low. Thus at this point in time the HADDR signals, which refer to the address values present on the host bus 44, are driven onto the bus by the address exchange latches 34. Thus at this time the memory addresses for the appropriate row begin being driven to the memory array devices after any gate delays in the memory controller 62 or buffers 66. Additionally, from time 200 to time 202, the next falling edge of the CLK1 signal, the HLOCMEM* signal, which indicates that the addresses presented will be responded to by the main memory array 58, begins going low. At time 202 the HADS* signal goes high. On the rising edge of the CLK1 signal prior to time 202, the data being written by the processor 20 is passed through the data exchange buffers 36 and appears on the HDATA lines in the host bus 44. Additionally, starting at time 202, the HPGHIT* signal goes low in the example, indicating that a memory page hit has been detected, thus indicating that the row addresses need not be driven for the next cycle. In this particular case, which is an initial write operation after an I/0 operation or after a bus arbitration cycle has completed, the HPGHIT* signal is ignored because if a different processor had control of the host bus 44 the row address in the memory devices may be different from that last used by this processor. Finally at time 202, the 386ADS* signal goes low, indicating that the next set of address and bus cycle definition signals are available. This address is latched into the address exchange latches 34 but not presented to the host bus 44 until after the write operation has been completed.

At time 204, the next falling edge of the CLK1 signal, the 386ADS* signal goes high, the HLOCMEM* signal is sampled and the HPGHIT* signal begins going low based on the 386ADS* signal for cycle 3-2 and the presented processor addresses. At time 206, the next falling edge of the CLK1 signal, the RAS* signal or signals go low, indicating to the memory devices in the memory array 58 that a row address has been properly presented. At time 208, the next falling edge of the CLK1 signal, the HRDY* signal goes low, indicating to the cache controller 24 that the memory cycle is completing and the next cycle can begin. Also at time 208 the memory controller 62 changes the address values being presented to the memory devices so that now the column addresses for memory cycle 3-1 are presented to the memory devices. At time 208, the HDMDOE* or host data to memory data output enable signal which provides the data to the memory devices through the data buffer 60 and is equivalent to the WE* signal utilized on the memory devices, goes low. This starts the write operation which is utilized by the memory devices and which is terminated by the inactivation or transfer to a high state of the CAS* signal. Finally, the HDATA values are presented to the memory devices by passing the HDATA values onto the MDATA lines through the data buffer 60.

Proceeding now to time 210, the next falling edge of the CLK1 cycle, the HADS* signal goes low, indicating that the next valid set of addresses is on the host bus 44. Also at this time the HRDY* signal goes high. At time 210 the CAS* signal appropriate for a given byte lane goes low, indicating to the memory devices that the column addresses and data are present, to complete the full addressing of the particular memory cells being utilized and to latch the data in the memory device. The memory devices of the preferred embodiment latch in the row addresses, column addresses and data on the falling edges of the particular strobe signals. Proceeding to the next falling edge of the CLK1 signal at time 212, the 386ADS* signal goes low to indicate the next write operation addresses are being presented on the processor bus 26; the HADS* signal goes high and the CAS* signal goes high, thus terminating the memory cycle 3-1. Additionally at time 212, the HPGHIT* signal is sampled and because it is low this is an indication that there is a memory page hit operation occurring in cycle 3-2, thus allowing the HRDY* signal to go low, indicating to the cache controller 24 that a memory cycle is completing. Therefore only the column addresses for cycle 3-2 need to be presented to the memory devices on the memory lines MA<10-0>, which are presented beginning at this time.

At time 214, the next falling edge of the CLK1 cycle, the 386ADS* signal goes high and the processor address values are latched into the address exchange latch 34. The HRDY* signal goes high and the HADS* signal goes low, indicating that the next cycle 3-3 will be beginning. The address values being presented to the host bus 44 are changed. Also at this time the CAS* signal goes low to indicate that the column addresses being presented to the memory devices are valid so that the data which was enabled to the memory devices through the data buffer 60 at time 212 and the data exchange transceiver 36 at the rising edge of the CLK1 signal after time 210 is properly stored in the memory devices. At the rising edge of the CLK1 signal after time 214 the data provided by the processor 20 is transferred through the data exchange transceivers 36 to the host bus 44.

At time 216, the next falling edge of the CLK1 cycle, the 386ADS* signal goes low, indicating the commencement of cycle 3-4 on the processor bus 26. The HADS* signal goes high, indicating that the column address values should be latched. Just prior to time 216, the HDATA values will have been enabled onto the bus by the data exchange buffers 36 for presentation to the memory devices. At time 216, the HPGHIT* signal is sampled to determine if this is yet another memory page hit operation. In this particular case it is and therefore the column addresses only for the third memory location are presented on the MA<10-0> lines at this time and the HRDY* goes low to indicate that the cycle will complete in the next CLK1 signal cycle. At time 216, the CAS* signal goes high and the data on the host bus 44 is presented to the memory devices.

At time 218, the next falling edge of the CLK1 signal, the 386ADS* signal goes high and the HADS* signal goes low, thus beginning cycle 3-4 which is a memory page miss write operation following a memory write operation. Cycles 3-2 and 3-3 were both memory page hit write operations and were performed in two CLK1 signal cycles, which equates in an 80386 to a zero wait state operation. Additionally at this time the HRDY* signal goes high, indicating that cycle 3-3 is completing. After time 218 the HPGHIT* signal goes high, indicating that the memory addresses presented by the processor at time 216 are a page miss and therefore page memory mode operation cannot be utilized. At time 218, the CAS* signal goes low, thus providing the final addressing of cycle 3-3 to the memory devices and causing the data to be properly stored.

At time 220, the next falling edge of the CLK1 signal, the HADS* signal goes high. Also at this time the data values presented by the processor will have begun properly appearing on the host bus 44. Yet again at this time the HPGHIT* signal is sampled to determine if a page hit operation is occurring. In this particular instance it is not because the signal is at a high level and therefore both row and column addresses must be presented to the memory device. At time 220 the CAS* signal goes high for cycle 3-3 and the HDMDOE* signal goes high. Thus at this point in time the memory data bus begins to float because the outputs are disabled. Additionally at time 220 the host memory controller 62 changes the address values being presented on the MA<10-0> lines to the row address values for cycle 3-4.

At the next rising edge of the CLK1 signal after time 220, the RAS* signal goes high, thus beginning the RAS precharge time. Operation continues at the same levels until time 222, the third falling edge of the CLK1 signal after time 220. At this time the RAS* signal is taken low. This period of time has allowed sufficient precharge to occur as needed for the memory devices. Thus now that the memory devices are ready for operation, the cycle can proceed. At time 224, the next falling edge of the CLK1 signal, the HRDY* signal goes low, indicating that the memory cycle is completing. At this time the address values which are presented on the MA<10-0> lines are changed to be the column addresses and the HDMDOE* signal goes low, thus gating the data which has been present on the host data bus since time 220 to the memory data bus and starting the data storage operation of the memory devices.

At time 226, the next falling edge of the CLK1 signal, the 386ADS* signal goes low, indicating that the addresses for cycle 3-5 are being presented by the processor 20. Also at time 226, the HRDY* signal goes high and the CAS* signal goes low, thus strobing the column addresses and the data into the memory devices. At this time, the HPGHIT* signal may go low because addresses are being presented by the processor 20 which are being compared by the page hit detector 43. At time 228, the next falling edge of the CLK1 signal, the 386ADS* signal goes high and the HADS* signal goes low, thus passing the addresses onto the host bus 44. Thus it can be seen that there is always a one CLK1 signal cycle delay for the presentation of the addresses by the processor 20 to the host bus 44. At time 228, the CAS* signal goes high and the HDMDOE* signal goes high completing the write operation of the memory devices and the column addresses presented on the MA<10-0> lines change temporarily to the read column addresses, not the write column addresses. This completes the storage operations of cycle 3-4.

On the rising edge of the CLK1 signal after time 228, the data is presented onto the host data bus from the processor 26. At time 230, the next falling edge of the CLK1 signal, the HADS* signal goes high. Cycle 3-5 is a page hit write operation and therefore when the HPGHIT* signal is sampled at time 230 it is sampled low, indicating that a page hit operation is occurring, so that the write column addresses are presented at this time on the MA<10-0> lines and that the HRDY* signal can go low because this is a page hit operation and therefore a zero wait state operation. Finally at time 230 the HDMDOE* signal goes low, thus enabling the data from the host bus 44 to the memory data bus for storage by the memory devices.

At time 232, the next falling edge of the CLK1 signal, the HRDY* signal goes high to indicate completion of the address portion of cycle 3-5. At this time the CAS* signal goes low, causing the memory devices to begin latching in the data presented on the memory data lines to the address as presented on the address lines at this time, which correspond to the column addresses of cycle 3-5. At time 234, the next falling edge of the CLK1 signal, the 386ADS* signal goes low, indicating the beginning of a new cycle which will be a page miss write cycle after several idle states and therefore the HPGHIT* signal may begin going high. Also at time 234, the CAS* and HDMDOE* signals go high, indicating that the memory operation of cycle 3-5 has been completed.

At time 236, the next falling edge of the CLK1 signal, the 386ADS* signal goes high and the HADS* signal goes low. This begins cycle 3-6 which is a page miss write operation which proceeds with similar timing to that of cycle 3-4. Thus, FIG. 3 has shown a series of write operations either following page hit or page miss write operations or idle states. It can be seen that the page hit write operations are done in zero wait states while the page miss write operations are done in four wait states and the initial write operation is done in three wait states.

FIG. 4 shows the read timing for the system for initial read operations, page hit read operations and page miss read operations. The first cycle 4-1 begins at time 250, a falling edge of the CLK1 signal, where the 386ADS* signal goes high and the HADS* signal goes low. This presents the addresses to the host bus 44 so that the row addresses are presented on the MA<10-0> lines and the HLOCMEM* signal may start going low. At time 252, the next falling edge of the CLK1 signal, the 386ADS* signal goes low to indicate the address and bus cycle definition values for the next read cycle 4-2 are valid and the HADS* signal goes high.

At time 254, the next falling edge of the CLK1 signal, the HLOCMEM* signal is sampled. At time 256, the next falling edge of the CLK1 signal, the RAS* signal goes low, thus indicating that the valid row addresses are presented. At time 258, the next falling edge of the CLK1 signal, the host memory controller 62 changes the address values being presented on the MA<10-0> lines to the column addresses for memory cycle 4-1. At time 260, the second rising edge of the CLK1 signal after time 258, the CAS* signal goes low to strobe in the column addresses so that the data can be obtained from the memory devices onto the memory data bus. At time 262, the falling edge of the CLK1 signal, the MDHDOE* or memory data bus to host data bus output enable signal goes low so that the data being presented by the memory devices in the memory array 58 can pass through the data buffer 60 to the host bus 44. At time 264, the next rising edge of the CLK1 signal, the HNA* signal goes low, indicating that the memory subsystem is ready for the next address to be developed. This is provided to the cache controller 24 so that a read cycle operation can proceed in pipelined mode. It is noted that the write operations are not pipelined while the read operations are pipelined.

At time 266, the next rising edge of the CLK1 signal, the HNA* signal goes high. At time 268, the next falling edge of the CLK1 signal, the HADS* signal goes low, thus transferring the address values for cycle 4-2 to the host bus 44. Also at this time the HRDY* signal goes low, indicating that cycle 4-1 is completing. Because the addresses have been transferred to the host bus 44, the column addresses for cycle 4-2 are presented on the MA<10-0> lines. At time 270, the next rising edge of the CLK1 signal, the CAS* signal goes high, thus ending the read operation to the memory devices.

At time 272, the falling edge of the CLK1 signal, the 386ADS* signal goes high, as does the HADS* signal. At this time the data which had been presented on the data portion of the host bus 44 is released because the MDHDOE* signal goes high, thus stopping the driving of the data. At time 272, the HPGHIT* signal is sampled to determine if this is a read hit operation. In the particular case shown it is, and therefore at time 274, the next rising edge of the CLK1 signal, the CAS* signal goes low to indicate to the memory devices that column addresses are present. At time 276, the next falling edge of the CLK1 signal, the MDHDOE* signal goes low so that the data which is being presented by the memory devices is transferred to the host bus 44. Then at time 278, the next rising edge of the CLK1 signal, the HNA* signal goes low, indicating that the cycle is completing and the cache controller 24 can allow operation to proceed. At time 280, the next falling edge of the CLK1 signal, the 386ADS* signal goes low, indicating that the processor 20 is presenting the next address onto the processor bus 26. Thus at this time the HPGHIT* signal may begin going high because in this case there is a page miss read operation occurring in cycle 4-3.

At time 282, the rising edge of the CLK1 signal, the HNA* signal goes high. At time 284, the falling edge of the CLK1 signal, the HADS* signal goes low, the HRDY* signal goes low, and the values being presented on the memory address bus change because of the address values presented on host address bus HADDR. At time 286, the rising edge of the CLK1 signal, the CAS* line goes high, thus latching data into the data buffer 60 driving the host data bus, terminating the read operation and the appearance of the memory data. At time 288, the next falling edge of the CLK1 signal, the 386ADS* and HADS* signals go high, as well as the HRDY* signal. The MDHDOE* signal goes high, thus ending the transfer of the data to the host bus 44. Additionally at time 288 the row address values for cycle 4-3 are presented to the memory address bus. Also at this time, the HPGHIT* signal is sampled to determine if the cycle is a page hit operation. In this case it is not and therefore both row and column addresses must be provided.

Therefore at time 290, the rising edge of the CLK1 signal, the RAS* signal goes high to allow a precharge time for the row addresses. At time 292, the next falling edge of the CLK1 signal, the HLOCMEM* signal is sampled to determine if this will be a cycle run by the host memory controller 62 or whether the bus controller 48 will control. In this case it is a local cycle and therefore the host memory controller 62 proceeds and continues to operate. The signals stay at this level until time 294, which is the second falling edge of the CLK1 signal, at which time sufficient precharge time has been available so that the RAS* signal can be lowered.

At time 296, the next falling edge of the CLK1 signal, the row and column addresses are changed so that the column addresses are appearing on the MA<10-0> lines. At time 298, the second rising edge of the CLK1 signal after time 296, the CAS* signal goes low to indicate that column addresses are present. At time 300, the next falling edge of the CLK1 signal, the MDHDOE* signal goes low so that the data which has been presented by the memory devices from time 298 is then passed to the host bus 44. At time 302, the next rising edge of the CLK1 signal, the HNA* signal goes low to indicate to the cache controller 24 that the cycle is terminating and the next address can be pipelined. At time 304, the next rising edge of the CLK1 signal, the HNA* signal goes high. At time 306, the next falling edge of the CLK1 signal, the 386ADS* signal goes low indicating that the next address is being presented by the processor 20. Also at this time the HRDY* signal goes low to indicate to the cache controller 24 that the memory is ready for the next cycle. Additionally at this time, the HPGHIT* signal will begin going high because the next addresses presented on the bus by the processor 20 indicate a page miss. At time 308, the rising edge of the CLK1 signal, the CAS* signal goes high, thus terminating the read operation of the memory devices. At time 310, the next falling edge of the CLK1 signal, the 386ADS* signal goes high as well as the HRDY* signal and the HADS* signal goes low, indicating that new addresses for cycle 4-4 are appearing on the host bus 44. Also at time 310 the MDHDOE* signal goes high, indicating that the data should no longer be passed from the memory array 58 to the host bus 44. At time 312, the HADS* signal goes high, commencing a second page miss read operation, in this case after an idle operation, for cycle 4-4. Timing of this operation is similar to the timing of cycle 4-3, which has been a page miss read operation after a read operation.

FIG. 5 shows the interaction between the various read and write cycles in various orders. It is noted that the cycles of FIG. 5 cannot actually be run by the processor unit P1 because of limitations of the cache controller 24, but are shown for exemplary reasons. Therefore, references to the 386ADS* signal will not be made. Cycle 5-1 is a page hit read operation after an idle operation, cycle 5-2 is a page hit write operation following the read operation, cycle 5-3 is a page hit read following a write operation, cycle 5-4 is a page miss write operation following a read operation and cycle 5-5 is a page miss read operation following a write operation.

At time 330, a falling edge of the CLK1 signal, the HADS* signal goes low, indicating that new addresses are present on the host bus 44. At this time the HGPHIT* signal should be going low because this is a page hit operation. Also at this time, the column addresses are being presented on the MA<10-0> line. At time 332, the next falling edge of the CLK1 signal, the HADS* signal goes high and the HPGHIT* signal is sampled. In this case it is low because this is a page hit operation. Then at time 334, the next rising edge of the CLK1 signal, the CAS* signal goes low so that the data begins appearing from the memory devices. At time 336, the next falling edge of the CLK1 signal, the MDHDOE* signal goes low so that the memory data is presented to the data portion of the host bus 44. At time 338, the rising edge of the CLK1 signal, the HNA* signal goes low to indicate to the cache controller 24 that the memory cycle is completing and the next address can be presented. At time 340, the next rising edge of the CLK1 signal, the HNA* signal goes high. At time 342, the next falling edge of the CLK1 signal, the HADS* signal goes low and the HRDY* signal goes low. Thus, the next address is being presented on the host bus 44 and the first cycle is indicated as being completed. At time 344, the next rising edge of the CLK1 signal, the CAS* signal goes high, ending the presentation of the data by the memory array 58.

At time 346, the next falling edge of the CLK1 signal, the HADS* signal goes high, as does the MDHDOE* signal. Additionally at this time, the HPGHIT* signal is sampled to determine if this is a memory page hit. In this case it is and therefore only column addresses need be used and the HRDY* signal is driven low to indicate the ending of a cycle. In this case, this is cycle 5-2, it is a write operation and therefore the data will be provided by the processor 20 and stored in the memory devices. Therefore because this is a page hit write operation, at time 348, the next falling edge of the CLK1 signal, the HRDY* signal goes low and the column addresses for cycle 5-2 appear on the MA<10-0> lines. Additionally at this time, the HDMDOE* signal goes low so that the data is transferred from the host bus 44 to the memory data bus and the memory write enable signal is lowered. At time 350, the next falling edge of the CLK1 signal, the HADS* signal goes low to indicate that the addresses for cycle 5-3 are being presented on the data bus. Also at this time the CAS* signal goes low so that the column addresses which have been latched by the memory controller 62 are presented and understood by the memory devices. It can be seen that there is a one cycle of the CLK1 signal after the next operation has been allowed to commence that the data is actually being supplied to the memory devices. Thus this saves one wait state of operation during memory writes. At time 352, the next falling edge of the CLK1 signal, the HADS* signal goes high, the CAS* signal goes high and the HDMDOE* signal goes high. The CAS* signal goes high to indicate the end of the write operation. The HPGHIT* signal is sampled to determine if this cycle 5-3 is a page hit operation. In this case it is a page hit read operation following the page hit write operation of cycle 5-2. Therefore row address strobe precharge time is not required and only column addressing needs to be used, however an additional CLK1 signal cycle is necessary to meet column address strobe precharge times. Thus at time 354, the second rising edge of the CLK1 signal, the CAS* signal is lowered, causing the memory devices to begin outputting data. At time 356, the next falling edge of the CLK1 signal, the MDHDOE* signal goes low so that the memory data is transferred to the host bus 44. At time 358, the next rising edge of the CLK1 signal, the HNA* signal goes low, indicating that the next address can be presented. At time 360, the next rising edge of the CLK1 signal, the HNA* signal goes high. At time 362, the next falling edge of the CLK1 signal, the HADS* and HRDY* signals go low, indicating that the next address is available on the host bus 44 and that cycle 5-3 is completing. At time 364, the next rising edge of the CLK1 signal, the CAS* signal goes high so that the memory devices stop driving data onto the memory data bus. At time 366, the HADS* and HRDY* signals go high, as well as the MDHDOE* signal, so that data is no longer being driven onto the bus by the data buffer 60. The HPGHIT* signal is sampled at this time.

The next operation is a page miss write operation following the read so that at time 368, the next rising edge of the CLK1 signal, the RAS* signal goes high to allow a precharge time for the next row addresses to be presented to the memory devices. Also at this time the processor 20 presents the data to the host bus 44. The precharge time continues until time 370, the third falling edge of the CLK1 signal after time 368, at which time the RAS* signal goes low so that the row addresses are strobed to the memory device. At time 372, the next falling edge of the CLK1 signal, the HRDY* signal goes low to indicate that the cycle is completing. Additionally at this time the HDMDOE* signal goes low so that the data is transferred from the host bus 44 to the memory data bus, where it is stored by the memory devices. At time 374, the next falling edge of the CLK1 signal, the HADS* signal goes low as does the CAS* signal. Therefore this is an indication that the next address is available on the host bus 44 and an indication to the memory devices to begin storing the data at the column address which is presented by the MA<10-0> lines.

At time 376, the next falling edge of the CLK1 signal, the HADS* signal goes high. At this time the HPGHIT* signal is sampled and found to be high, therefore indicating that this is a page miss operation. Also at this time the CAS* and the HDMDOE* signals go high, thus ending the memory write operation of cycle 5-4. At time 378, the next rising edge of the CLK1 signal, the RAS* signal goes high so that the row address precharge time can be developed. Then at time 380, the third falling edge of the CLK1 signal, the RAS* signal goes low so that the row addresses are strobed into the memory devices. At time 382, the next falling edge of the CLK1 signal, the memory controller 62 changes the addresses being presented on the MA<10-0> lines so that now the column addresses of cycle 5-5 are presented. Then at time 384, the second rising edge of the CLK1 signal, the CAS* signal goes low strobing in the column addresses so that the memory data begins appearing on the memory data bus. At time 386, the next falling edge of the CLK1 signal, the MDHDOE* signal goes low so that the memory data is transferred to the host bus 44. At time 388, the next rising edge of the CLK1 signal, the HNA* signal goes low to indicate to the cache controller 24 that the cycle is completing and the next address can be presented. At time 390, the next rising edge of the CLK1 signal, the HNA* signal is raised. At time 392, the next falling edge of the CLK1 signal, the HADS* and HRDY* signals go low to indicate that the next addresses are available on the host bus 44 and that cycle 5-5 is completing. At time 394, the next rising edge of the CLK1 signal, the CAS* signal goes high to terminate the read operation of the memory devices. Then at time 396, the next falling edge of the CLK1 signal, the HADS, HRDY* and MDHDOE* signals go high. This thus completes the page miss read operation.

It can be seen that the timing of the computer system is such that a page hit indication is sampled only a very short time after the addresses are actually presented on the host bus 44, which, given the propagation delays of conventional circuits available today, is one CLK1 signal cycle earlier than if the page address determination would have been made based on the host address values, particularly when it is noted that the cycle time of the CLK1 signal in the preferred embodiment is only 30 nsec and time must be provided for the addresses to settle. By having the page hit detector 43 located on the processor bus 26, thus an entire one full 30 nsec CLK1 signal cycle is available to do this operation. It can also be seen that during write operations the host bus 44 is released to the cache controller 24 one CLK1 signal cycle before normally done if the addresses and data were not latched by the host memory controller 62 and the data buffer 60.

Figure 6:
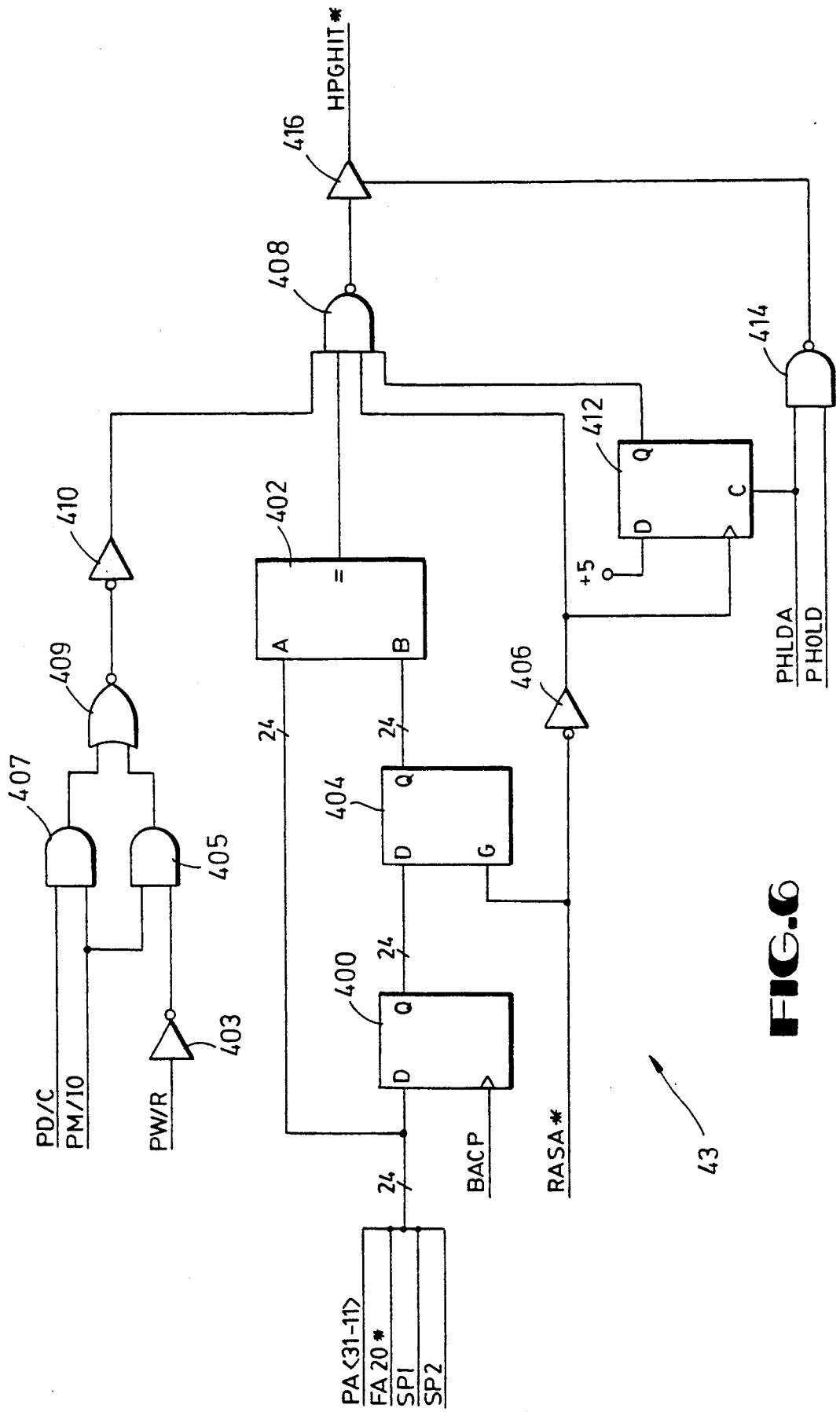

The page hit detector 43 is shown in block diagram form in FIG. 6. A 24 bit wide D-type flip-flop 400 has connected to its D input the PA<31-11> signals, the FA20* signal and two spares signals, SP1 and SP2. The PA<31-11> signals are the respective address signals from the processor 20, while the FA20* signal is a signal which indicates that the A20 bit is being forced to a 0 for backward compatibility reasons. The clocking input to the flip-flop 400 receives the BACP signal from the cache controller 24, which provides a positive edge whenever the processor cycle is to be forwarded to the host bus 44. Thus the output of the flip-flop 400 matches the addresses on the host bus 44. The flip-flop 400 is provided in the preferred embodiment because the page hit circuitry 43 is preferably contained in a single integrated device and thus fewer inputs are needed on the device. Additionally, the 24 inputs connected to the flip-flop 400 are connected to the A inputs of a 24 bit comparator 402. The noninverted outputs of the flip-flop 400 are connected to the D inputs of a 24 bit latch 404. The outputs of the latch 404 are connected to the B input of the 24 bit comparator 402 so that a comparison is made between the addresses as presented by the processor 20 and as latched by the transparent latch 404. The gating signal for the latch 404 is provided by the RASA* signal, which is a more specific variation of the RAS* signal described in the timing diagrams. Thus, this signal latches the previous set of row addresses used by the host memory controller 62 so that a true previous page versus current desired page comparison is done by the comparator 402. It is to be noted that the RASA* signal stays low at all times except when a page break or miss is detected.

The RASA* signal is inverted by an inverter 406 whose output is connected to one input of a 4 input NAND gate 408. A second input to the NAND gate 408 is connected to the equal output of the comparator 402 to provide for the comparison indication. A third input to the NAND gate 408 is connected to the output of an inverter 410 whose input is connected to the output of a 2 input NOR gate 409. One input of the NOR gate 409 is connected to the output of a 2 input AND gate 407, whose inputs are the PM/IO and PD/C signals, which come from the processor 20. The second input of the NOR gate 409 is connected to the output of a 2 input AND gate 405, whose inputs are the PM/IO and PW/R* signals. Thus, the output of the inverter 410 is high if a memory data or write cycle is occurring.

The final input to the NAND gate 408 is the output of a D-type flip-flop 412. The D input of the flip-flop 412 is connected to a logic level 1 while the clocking input is connected to the output of the inverter 406. The clear input of the flip-flop 412 is connected to the PHLDA signal so that whenever the processor 20 is acknowledging that it is in a hold state, the flip-flop 412 has a zero output, thus producing a high level output on NAND gate 408, which indicates that a page hit has not been detected. Thus, by this combination it is guaranteed that the first or initial cycle after the processor 20 regains control of the host bus 44 is treated as a page miss operation as might be the case should processor P2, for example, have controlled the bus and addressed various memory addresses. Were the page hit detector 43 to not, take notice of this condition, then if the alternate bus controller had actually changed the pages this would not necessarily be indicated as such and therefore erroneous operation could occur.

The PHLDA signal is also one input to a 2 input NAND gate 414 whose other input is the PHOLD signal. The output of NAND gate 414 goes to the tri-state control input of a buffer 416 whose input is connected to the output of the NAND gate 408 and whose output is the HPGHIT* signal. By using a tri-state buffer 416 as the actual driving device for the HPGHIT* signal, this allows processors P1 and P2 to both utilize page hit operations and not require the memory controller 62 to have separate inputs. The NAND gate 414 is used to disable a particular processor's page hit detection circuitry 43 whenever it is truly in a held condition and does not have control of the bus as indicated by both the PHLDA and PHOLD signals being high.

Figure 18:
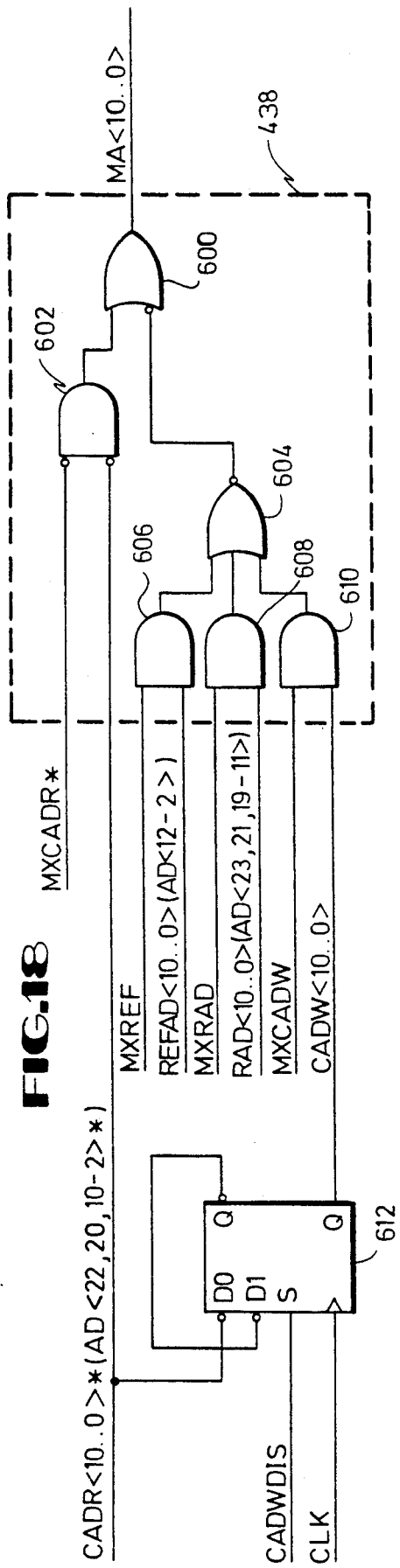
Figure 7:
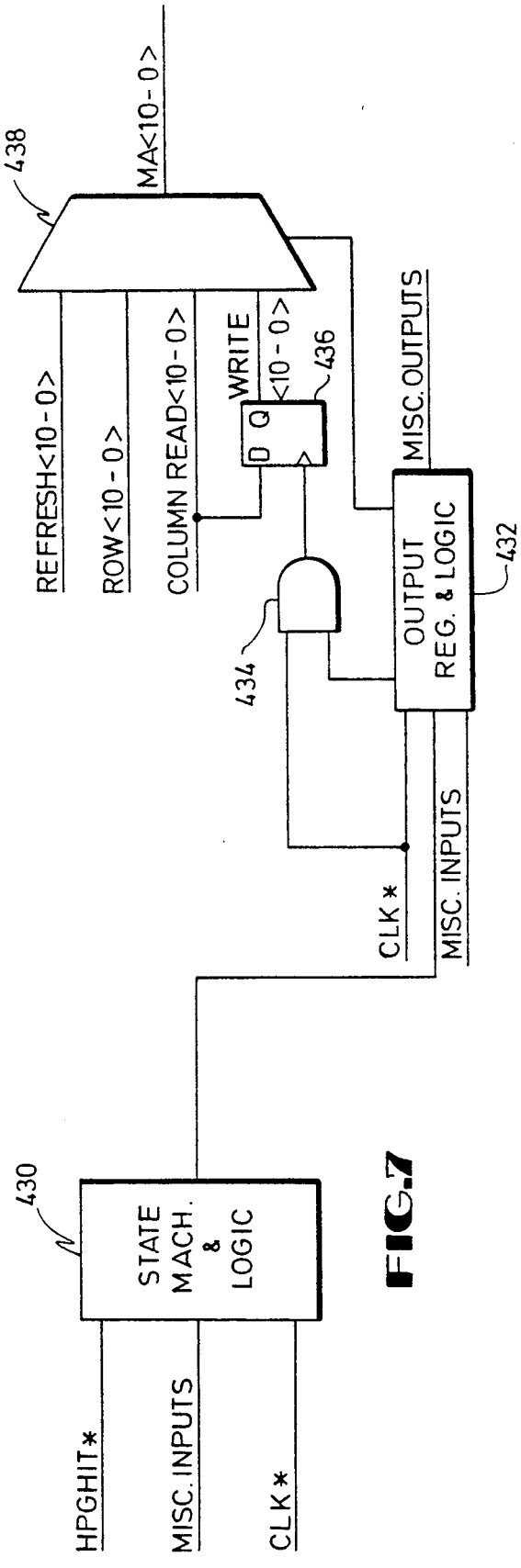

A high level block diagram of portions of the host memory controller 62 is shown in FIG. 7. A state machine and associated logic block 430 has as its inputs the HPGHIT* signal, a clock signal CLK* and various miscellaneous inputs received from the host bus 44. A series of outputs are provided by the state machine and logic circuit block 430 to the output register and logic circuitry 432. The output register and logic circuitry 432 has a series of inputs and a series of outputs and additionally has the CLK* signal as an input for clocking purposes. One output of the output register and logic circuitry 432 is connected to one input of a 2 input AND gate 434 whose other input is the CLK* signal. The CLK* signal is generated by a combination of the CLK2 and CLK1 signals as shown in FIG. 20. The output of the AND gate 434 is connected to the input to an 11 bit wide D-type flip-flop 436. The AND gate 434 is not actually present in the preferred embodiment but is shown in FIG. 7 for conceptual and illustrative purposes. The actual devices in the preferred embodiment are shown in FIG. 11 and 18. The inputs to the flip-flop 436 are the COLUMN READ<10-0> signals. The flip-flop 436 is used to latch the column write addresses so that the memory cycle can be terminated earlier than otherwise normally possible because the cache controller 24 would remove the addresses and data too early because of the zero wait state timing of the HRDY* signal. An 11 bit wide 4:1 multiplexer 438 is utilized to couple the four types of addresses in this case to the MA<10-0> lines. The four inputs to the multiplexer 438 are the REFRESH<10-0> signals, the ROW<10-0> signals, the COLUMN READ<10-0> signals and the COLUMN WRITE<10-0> signals which are provided by the output of latch 436. The control of the multiplexer 438 is provided by four signals output from the output register and logic circuitry 432. The refresh addresses are used because the main memory array 58 is preferably formed of DRAM's and therefore refreshing is necessary. These portions of the memory controller 62 will be described in more detail.

A block diagram of the data buffer 60 is shown in FIG. 19. The data buffer 60 provides the parity generation, latching and transceiving functions necessary to transfer data between the memory array 58 and the host bus 44. The memory data bus bits <31-0> are connected to the D inputs of a 32 bit wide transparent latch 450. The outputs of the latch 450 are connected to a 32 bit wide buffer 452 whose inverted tri-state control input has connected to it the MDHDOE* signal. The output of the buffer 452 is connected to the HD<31-0> lines that form the data bus of the host bus 44. The CAS* signal is connected the inverted gating input of the latch 450. Thus when the CAS* signal is low the data is being passed through the latch 450. This provides transfer from the memory data bus to the host data bus 44. A similar 32 bit transparent latch 454 has connected to its D inputs the HD<31-0> lines from the host bus 44 and has as its outputs connected to a 32 bit tri-state buffer 456 whose inverted tri-state control input is connected to the HDMDOE* signal. The outputs of the buffer 456 are connected to the MD<31-0> lines, thus allowing the 32 bits of data to be transferred from the host bus 44 to the memory data bus. Also connected to the MD<31-0> lines is a parity generator/checker 458 to provide parity information and checking generally utilized with dynamic RAM's. The CAS* signal is connected to the input of an inverter 460 whose output is connected to the inverted enable input of the latch 454. In this manner, the data which is present on the host bus 44 is transmitted through the latch 454 whenever the CAS* signal is high, so that when the CAS* signal goes low, this data is then latched, thus allowing extension of the period of the data available, thus cooperating with the latched addresses as done in the memory controller 62 to allow the one CLK1 cycle extension. Preferably the various latches and buffers are implemented as byte wide devices with CAS* signals being used for each byte lane so that only properly requested bytes are latched.

Figure 8:
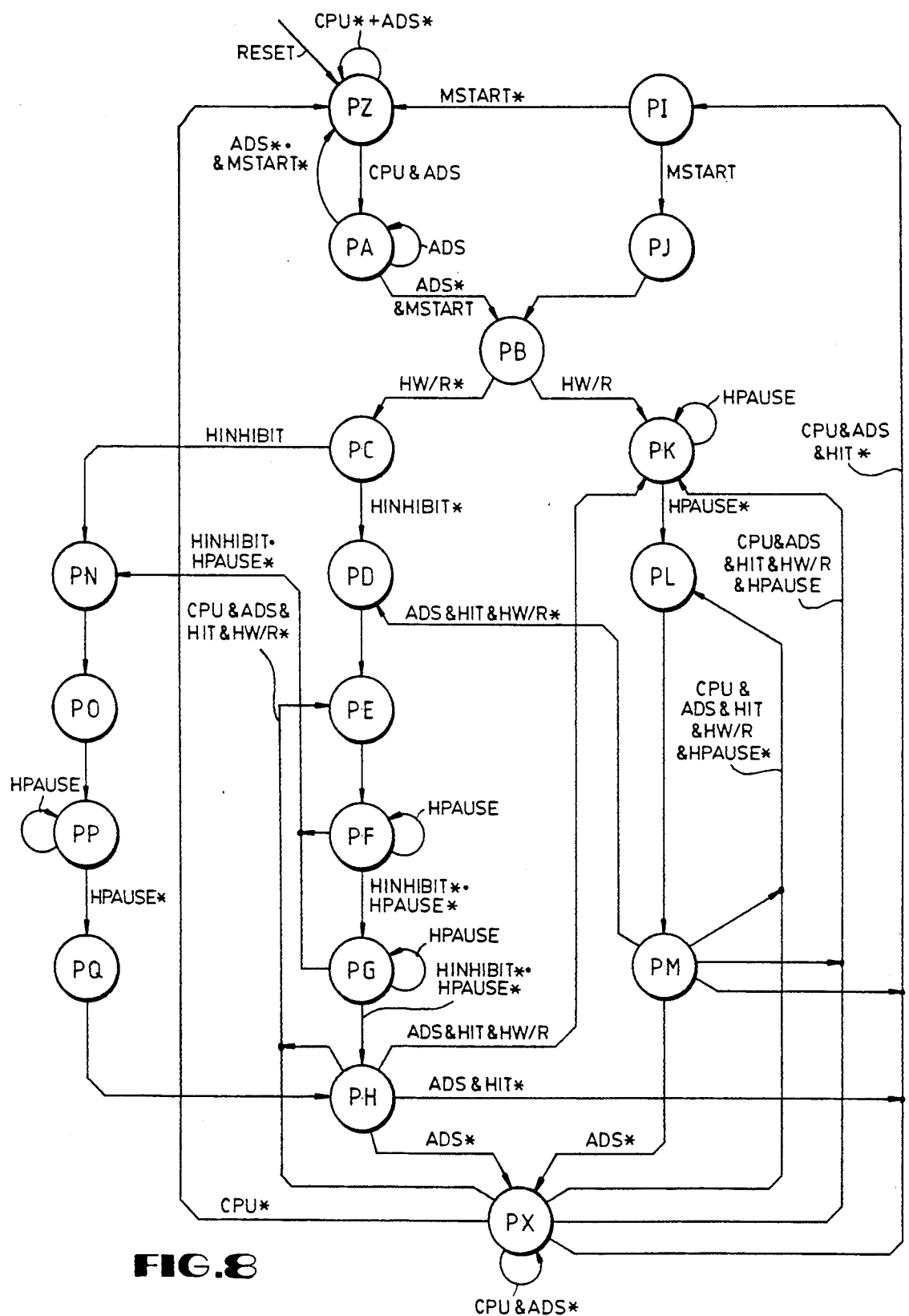
FIG. 8 is a state diagram of the state machine of FIG. 7.

The state machine utilized in the host memory controller state machine and logic block 430 is shown in diagramatic form in FIG. 8. Upon reset of the computer system C, the state machine is initialized to state PZ. Control remains in state PZ, the RAS* signal high idle state if the processor processors connected to the host bus 44 are not in control of the host bus as indicated by the CPU signal being low or if the ADS* signal is not low. The state machine is clocked by the CLK signal (FIG. 20). The CPU signal is developed by synchronizing the HLDA signal provided to the bus controller 48 by the arbitration logic 77 with the CLK1 signal. If, however, processor P1 or processor P2 is in control of the host bus 44 and the ADS* signal is low, then control proceeds to state PA. The state machine remains in state PA while the ADS* signal is low. If the ADS* signal goes high and this is a local memory read or date operation as indicated by the MSTART signal being high, a memory start operation, then on the next rising edge of the CLK signal control transfers to state PB. If the ADS* signals is high and this either not a local memory cycle, it is an I/O cycle or it is a memory write code cycle, then control transfers to state PZ.

There are two exits from state PB, depending upon whether this is a write or a read cycle. If it is a read cycle, then at the next rising edge of the CLK signal the state machine advances to state PC. On the next rising edge the state machine advances to state PD if a signal referred to as HINHIBIT* is high or regated. The HINHIBIT* signal is provided by a write-back cache controller (not shown) to indicate that the cache contains the valid copy of the data for the particular addressed memory location. In that instance the system must transfer the data from the cache to the main memory. Thus a read cycle is converted to a form of write cycle. On the next rising edge of the CLK signal control transfers from state PD to state PE and then on the next rising edge to state PF. Control remains in state PF if the HPAUSE signal is high, which indicates that insertion of a wait state is desired. While not preferred, wait states can be added using the HPAUSE signal to allow use of different memory devices if desired or to allow a cache controller sufficient time to perform certain snooping functions. If the HPAUSE signal is low and the HINHIBIT* signal is high, control proceeds to state PG on the next rising edge of the CLK signal. If the HPAUSE signal is high, control remains in state PG, while control proceeds to state PH on the next rising edge of the CLK signal when the HPAUSE signal is low and the HINHIBIT* signal is high. This full path from state PZ is taken in the case of initial read operations.

If in either of states PF or PG the HINHIBIT signal is high, indicating a cache write back situation, and the HPAUSE signal is low, control proceeds to state PN. Control also transfers to state PN from state PC if the HINHIBIT signal is asserted at that time. Control proceeds from state PN to state PO to state PP on successive rising edges of the CLK signal. Control remains at state PP if the HPAUSE signal is high. If the HPAUSE signal is low, control proceeds to state PQ and then to state PH, completing the write-back operation.

There are four possible locations where control can proceed from state PH. If the ADS* signal is low, the HIT signal is true or high and it is a read operation, control returns to state PE. Thus, in the case of a page hit read following a read operation, control transfers from state PH to state PE. If, however, it was a page hit write operation, control transfers from state PH to state PK. If the ADS* signal is low and it is not a hit operation, then control proceeds to state PI. If the ADS* signal is high, then control proceeds to state PX.

Control remains or idles in state PX with the RAS* signal low if a processor is in control of the host bus 44 as indicated by the CPU signal being high and the ADS* signal remains high. This can be seen in the two idle state operations of FIG. 3 just prior to cycle 3-6. If a processor is not controlling the host bus 44, then control transfers from state PX to state PZ to begin an initial cycle, whether it be a read or write operation. If a processor is controlling the host bus 44, the ADS signal is high, it is a page hit operation and it is a read operation, control transfers from state PX to state PE to do a read page hit operation after an idle state. If a processor is still controlling the host bus 44 as indicated by a high level CPU signal, the ADS signal is high and it is not a hit cycle, then control proceeds to state PI.

State PI has two exits, one to state PZ if it is not a memory start operation, and the other to state PJ if there is a memory start operation. The path from state PI to state PJ to the mandatory transfer to state PB is used to provide the RAS precharge time necessary for memory devices. After control has transferred from state PJ to state PB, control then transfers to state PC for read operations, as previously indicated, or to state PK if a write operation is occurring. Control remains in state PK if the HPAUSE signal is high and transfers to state PL if the HPAUSE signal is low. Control transfers from state PL to state PM in all cases.

There are five exits from state PM. If the HADS* signal is high control proceeds to state PX This is the instance where an idle state is being entered. There are two exits from state PX into this write path and they occur from state PX to state PK if it is a processor is controlling the host bus 44, the ADS* signal is low, it is a page hit, a write and the HPAUSE signal is high. If the other conditions are met and the HPAUSE signal was low, then control transfers to state PL. Transfer is made from state PM to state PK if the ADS* signal is low, the hit signal is high, it is a write cycle and the HPAUSE signal is high. If the HPAUSE signal were low, then control would transfer to state PL, the case for back to back page hit write operations. If the ADS* signal is low, it is a page hit and it is a read operation, then control transfers from state PM to state PD to commence a page hit read operation following a write operation. The final transfer out of state PM is a transfer to state PI if the ADS* signal is low and there is not a page hit as indicated by the HIT or HPGHIT signal being low. This transfer begins the RAS precharge for the DRAM's.

It is noted that the various states of the state machine have been indicated on FIGS. 3, 4 and 5 so that operation of the state machine in relation to the timing diagrams can easily be tracked.

Figure 9:
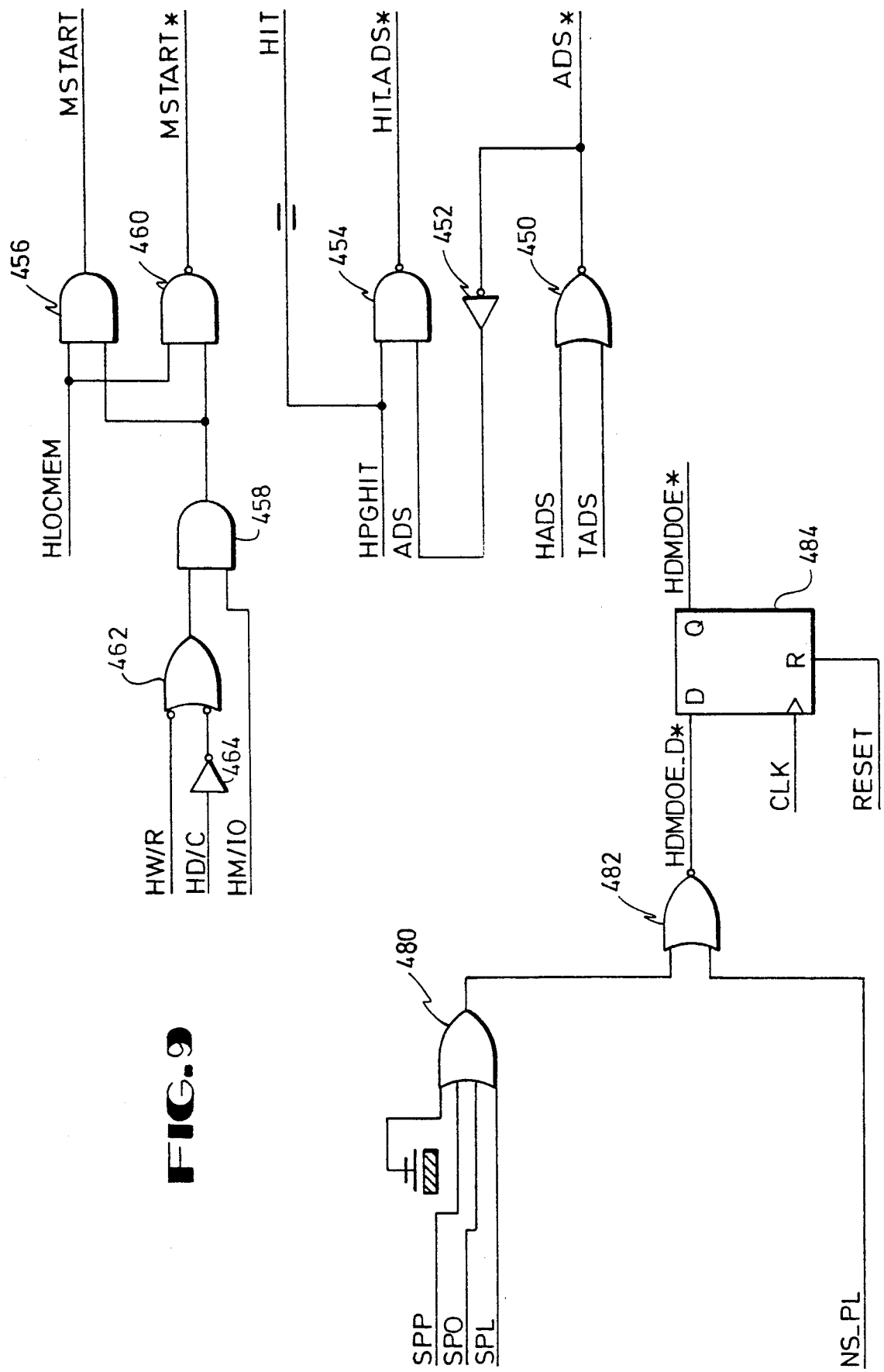

Logic circuitry is required to develop some switching signals utilized by the state machine. Portions of this logic are shown in FIG. 9. The ADS* signal is developed as the output of a two input NOR gate 450 whose inputs are the HADS signal and TADS signal. The HADS signal is the address status signal available on the host bus 44 and the TADS signal is the address status signal produced by logic which cooperates with the cache controller 24 to allow a 64 kbyte cache to be implemented. The TADS signal is a signal transparent to the cache controller 24 to allow a second double word to be read during cache miss read situations. For more details of operation of this train logic, please see copending application Ser. No. 354,349, entitled "Quadruple Word, Multiplexed Paged Mode and Cache Memory", filed May 19, 1989 and assigned to the assignee of this invention, which is hereby incorporated by reference. The ADS* signal is inverted by an inverter 452 whose output is connected to one input of a 2 input NAND gate 454. The other input to the NAND gate 454 is the HPGHIT signal, which is also referred to as the HIT signal. The output of NAND gate 454 is the HIT.ADS* signal, which is an indication, if it is low, that there has been a page hit in combination with the ADS signal going high.

The MSTART signal utilized by the state machine is produced as the output of a two input AND gate 456, one of whose inputs is the HLOCMEM signal and whose other input is the output of a two input AND gate 458. The output of the AND gate 458 and the HLOCMEM signal are also the two inputs to a 2 input NAND gate 460 whose output is thus the MSTART* signal. The two inputs to the AND gate 458 are the HM-IO signal and the output of a 2 input NAND gate 462. One input to the NAND gate 462 is the HW-R signal and the other input is connected to the output of an inverter 464. The input to the inverter 464 is the HD-C signal. Thus the MSTART signal indicates a local memory, data or read operation.

Figure 10:
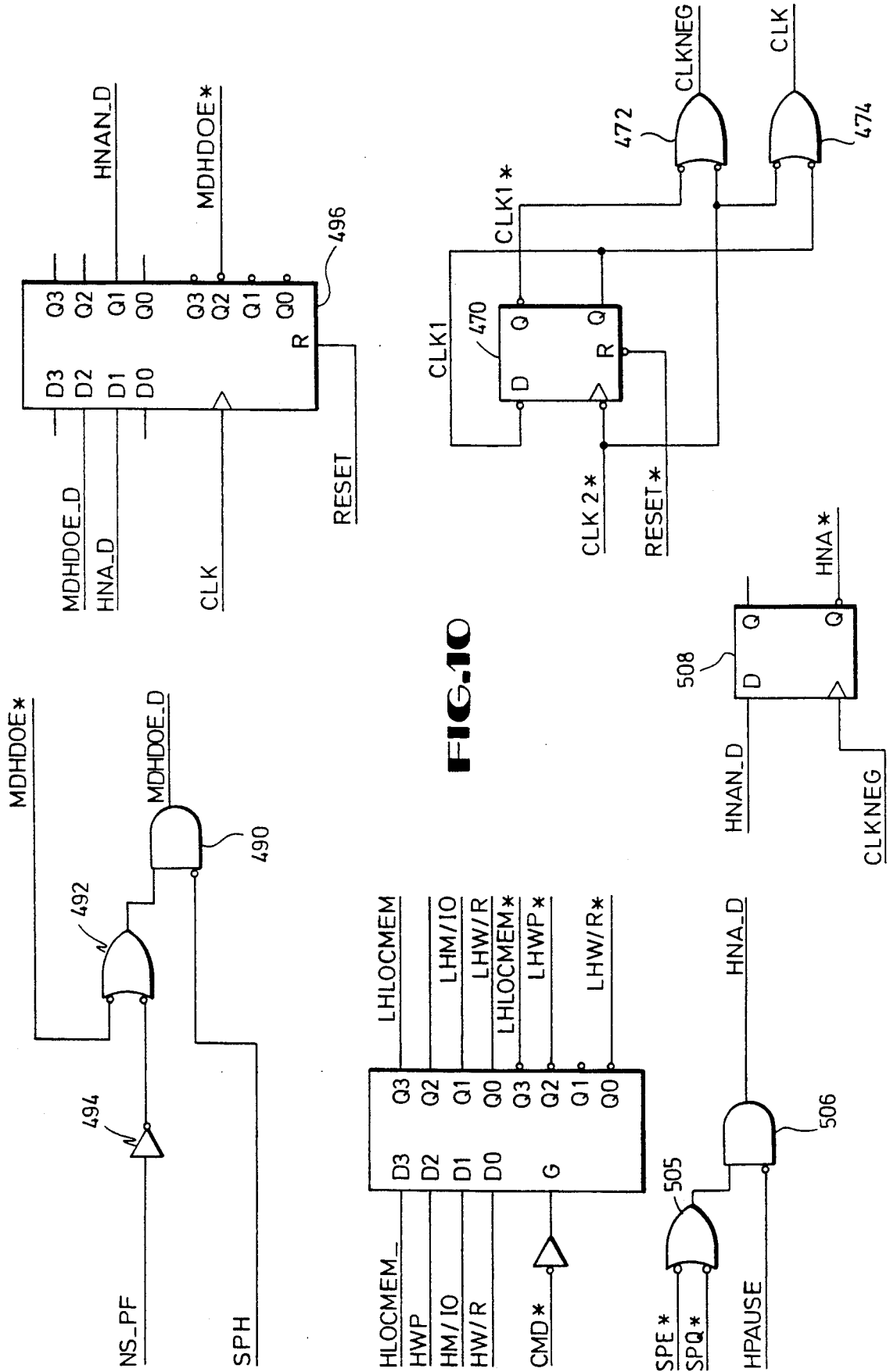

Clocking signals are utilized to advance the state machine and perform various functions in the memory controller 62 as indicated by the timing diagrams. The CLK2* signal is provided to the inverted clocking input of a D-type flip-flop 470 (FIG. 10). The noninverted output of the flip-flop 470 is connected to the inverted D input so that a divide by two toggle configuration develops. The noninverted output is considered to be the CLK1 signal so that the inverting output of the flip-flop 470 is the CLK1* signal. The RESET* signal, which goes low to indicate computer system C reset, is provided to the reset input of the flip-flop 470 to allow synchronization with the computer system C. The CLK1* signal is provided as one input to a 2 input NAND gate 472, whose other input is the CLK2* signal. The output of this gate 472 is called the CLKNEG signal and is used in clocking certain portions of the RAS signals. The CLK1 signal is connected as one input to a 2 input NAND gate 474, whose other input is connected to the CLK2* signal. The output of this NAND gate 474 is the CLK signal, which is used to advance the state machine and to latch numerous signals in the memory controller 62. The resulting waveforms are shown in FIG. 20.

Because the memory controller 62 is based on a synchronous state machine, combinations of the various states are used to produce the necessary signals as shown in the timing diagrams. The logic utilizing that will now be described.

Signals indicating that the state machine is in state PP, state PO or state PL are combined by an OR gate 480 (FIG. 9) whose output is connected to the input of a 2 input NOR gate 482. The second input of the NOR gate 482 receives a signal which indicates that the next state of the machine will be state PL. The output of the NOR gate 482 is the HDMDOE_D* signal, which is provided to the D input of a D-type flip-flop 484, whose clocking input is connected to the CLK signal and whose reset input is connected to the RESET signal. The noninverted output of the flip-flop 484 is the HDMDOE* signal, which is presented to the memory devices to act as the memory write strobe and to the data buffer 60 as the output enable signal.

A signal indicating that the state machine is in state PH is provided to an inverted input of a 2 input AND gate 490 (FIG. 10). The second input to the AND gate 490 is the output of a 2 input NAND gate 492, one of whose inputs is connected to the output of an inverter 494 whose input is connected to the next state PF or NS_PF signal. The second input to the NAND gate 492 is the MDHDOE* signal, which is provided at an inverted output of a 4 bit true and inverted output D-type flip-flop 496 and it utilized by the data buffers 60. The flip-flop 496 is clocked by the CLK signal and reset input is connected to the RESET signal. The output of the AND gate 490 is connected to the D input of the flip-flop 496 corresponding to the MDHDOE* signal output.

A signal indicating that the state machine is not in state PE (SPE*) is connected to one input of a two input NAND gate 505, whose other input receives the not state PO (SPO*) signal. The output of the NAND gate 505 is provided to one input of a 2 input AND gate 506.

The other input of the AND gate 506 is inverted and has connected to it the HPAUSE signal. The output of the AND gate 506 is connected to a D input of the flip-flop 496 with the noninverted output associated with that particular D input being connected to the D input of a D-type flip-flop 508. The clocking signal for flip-flop 508 is the CLKNEG signal and the inverted output of flip-flop 508 is the HNA* signal, which is supplied to the host bus 44. By using the CLKNEG signal the HNA* signal is produced on the rising edge of the CLK1 signal, not the falling edges as done with most of the other signals.

The HRDY signal is developed by the noninverted output of a D-type flip-flop 516 (FIG. 11) whose clock input is connected to the CLK signal. The inverted D input is connected to the output of a 3 input NOR gate 518 whose inputs are signals representing that the next state of the machine is state PH, that the next state of the state machine is state PL or that the bus controller 48 is ready. The use of the next state PL signal allows the generation of the HRDY signal on the state after entry into a page hit write operation, with the HIT signal being sampled upon entry to state PL. If the sampling had been delayed one CLK1 signal cycle the HRDY signal could not have been generated adequately to allow for proper HRDY signal timing without incurring a wait state. The output of NOR gate 518 is also connected to the inverting D1 input of a multiplexed input flip-flop 518. The inverted D0 input is connected to a high level logic signal. The select input, the level of which controls whether the D0 or D1 input is to be used based on a low or high level, respectively, is connected to the BRDYDIS* signal, which is active or low on the first double word read of a train or quadruple word cache miss fill operation. This connection keeps one of the read operations invisible to the cache controller 24. The flip-flop 518 is clocked by the CLK signal and produces the BRDY signal at its noninverting output. A signal indicating that the next state of the state machine is state PG is connected to one input of a two input NOR gate 222, whose other input is connected to a signal which indicates that the next state of the state machine is state PQ and whose output is connected to the inverting input of a D-type flip-flop 524. The clock signal of the flip-flop 524 is connected to the CLK signal. The noninverted output of the flip-flop 524 is the TRDY signal which is used with the train logic discussed above.

The LHWP or latched host bus write protect signal, which indicates that this memory location is write protected, is provided to the D input of a D-type flip-flop 530 (FIG. 12), whose clocking input receives the BELAT signal. The LHWP signal is a version of the host bus write protect signal which is latched when the RASA* signal is low and transparent when the RASA* signal is high. This latching insures that the LHWP signal does not change during page hit operations. The BELAT signal is used to properly latch the byte enable signals received and present on the host bus 44 and also has appropriate timing to latch in the LHWP signal. The inverted output of the flip-flop 530 is connected to one input of a 2 input NAND gate 532, whose other input is a signal provided as the output of a two input OR gate 531, whose inputs are signals indicating that the state machine is in state PL or the next state is state PQ. The output of the NAND gate 532, which goes low during appropriate periods of non-protected write cycles, is connected to the inverted D1 input of a multiplexed input flip-flop 535. The D0 inverted input is connected to a high logic level. The clocking signal to the flip-flop 535 is provided by the CLK signal. The multiplexer select input is connected to the output of a 2 input NOR gate 536 whose inputs are the REFRESH signal and the latched version of the HLOCMEM* signal. The REFRESH signal indicates that a refresh operation is in process for the dynamic RAM's. The output of flip-flop 534, which goes high during non-protected, local, non-refresh memory write cycles, is connected to one input of a series of four 2 input OR gates 538, 540, 42 and 544.

Figure 14:
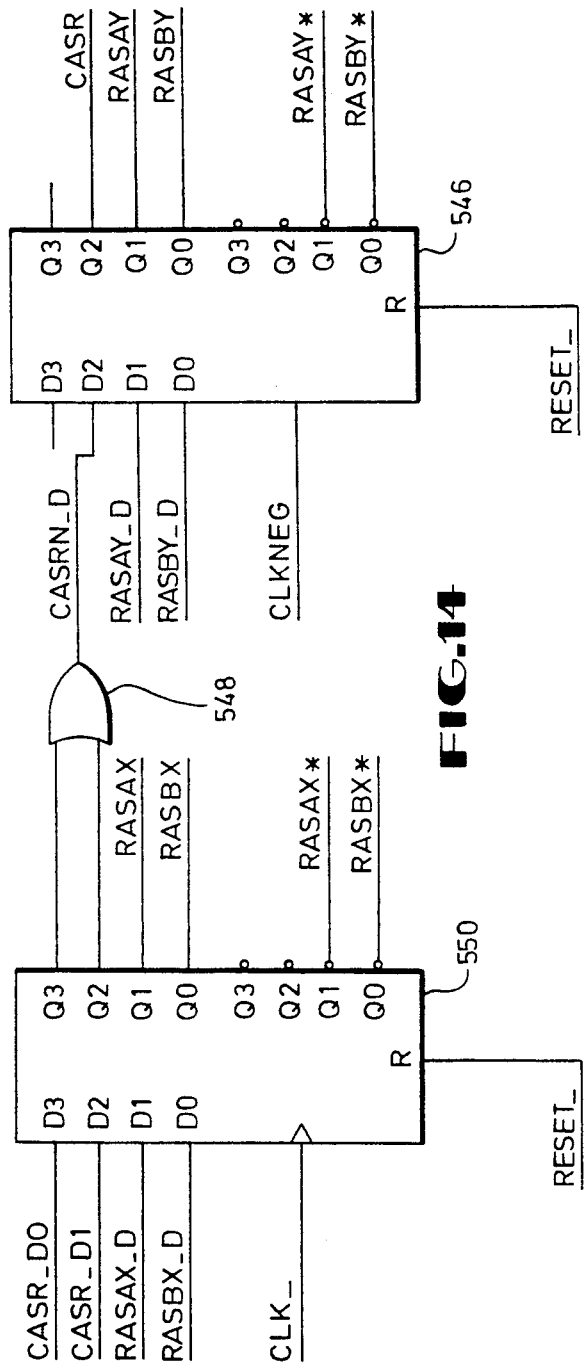

The other input to the OR gates 538, 540, 542 and 544 is connected to the CASR signal, which is one output of a 4 bit flip-flop 546 (FIG. 14). The flip-flop 546 is reset by the RESET signal and is clocked by the CLKNEG signal. The respective D input is connected to the output of a 2 input OR gate 548. The two inputs to the OR gate 548 are connected to two outputs of a 4 bit flip-flop 550 whose reset input is connected to the RESET signal and whose clocking input is connected to the CLK signal. The two respective D inputs to the flip-flop 550 are the CASR_D0 and CASR_D1 signals. The CASR_D1 signal is effectively a signal which indicates that the next state of the state machine is state PE (FIG. 12), while the CASR_D0 signal is the output of a 2 input OR gate 552, whose inputs are, respectively, the next state PG or next state PF signals. Thus the CASR signal goes high during appropriate periods of read cycles based on the CLKNEG signal.

The outputs of the OR gate 538, 540, 542 and 544 are connected, respectively, to one input of four 2 input NAND gates 554, 556, 558 and 560. The other input to each of these NAND gates is respectively one of the LBE<0>, LBE<1>, LBE<2> or LBE<3> signals, which represent latched versions of the byte enable signals present on the host bus 44. The outputs of the four NAND gates 554, 556, 558 and 560 are the CAS<3-0>* signals, which are used to enable the particular byte lane of both the buffer 60 and the memory array 58.

Figure 13:
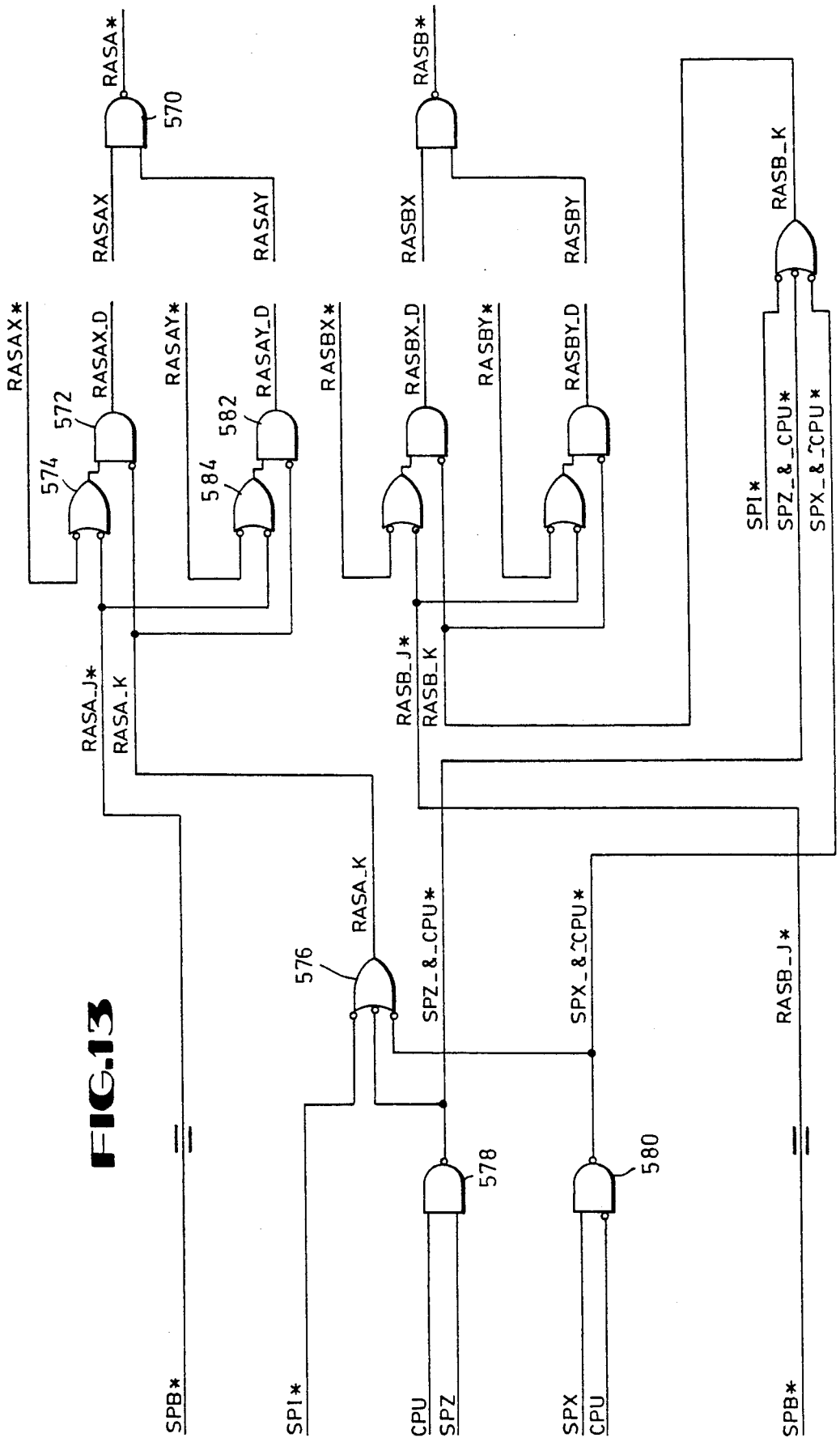

The row address strobe enable or RAS circuitry is basically developed as follows. The RASA* signal is produced as the output of a 2 input NAND gate 570 (FIG. 13) whose two inputs are the RASAX and RASAY signals. The RASAY signal, and its complement, the RASAY* signal, are provided by the output of the flip-flop 546 (FIG. 14), with the respective D input being the RASAY_D signal. The RASAX signal and its complementary RASAX* signal are produced as outputs of the flip-flop 550 based on a respective input of the RASAX_D signal. The RASAX_D signal is the output of a 2 input AND gate 572. One input to the AND gate 572 is connected to the output of a 2 input NAND gate 574, one of whose inputs is the RASAX* signal and whose other input is the RASA_J* signal, which corresponds to the state machine not being in state PB. The second input to the AND gate 572 is inverted and is provided by the output of a 3 input NAND gate 576. One of the inputs to the NAND gate 576 is a signal indicating that the state machine is not in state PI. The second input to the NAND gate 576 is the output of a 2 input NAND gate 578, whose inputs are the CPU and state PZ signals. The third input to the NAND gate 576 is provided by the output of a 2 input NAND gate 580, whose effective inputs are the CPU* signal and an indication that the state machine is in state PX. The output of NAND gate 576 is also provided to an inverted input to a 2 input AND gate 582 whose output is the RASAY_D signal. The second input to the AND gate 582 is connected to the output of a 2 input NAND gate 584 whose inputs are the RASA_J* signal and the RASAY* signal. Thus it can be seen that this combination of logic is such that the RASA* signal will go low on a falling edge of the CLK1 signal and will go high on a rising edge of the CLK1 signal because of the use of the two latches 546 and 550. Identical circuitry is used to produce the RASB* signal, which is developed because of timing considerations.

The construction of the multiplexer 438 is shown in FIG. 18. It is noted that the block shown in FIG. 18 is represented as a single bit but it is noted that eleven like circuits are present, the difference being the bit position of the appropriate busses connected to each circuit The MA<10-0> signals are produced as the output of a 2 input OR gate 600. One input to the OR gate 600 is connected to the output of a 2 input NOR gate 602, one of whose inputs receives the MXCADR* signal, which is a signal that causes the multiplexer to select the signals received at the other input to the NOR gate 602, which is the CADR<10-0>* signals. These signals are effectively the 22nd, 20th and tenth to second bit positions of the address signals presented to the memory controller 62. These are the column addresses appropriate for the particular memory device, with bits 20 and 22 being provided to allow for connection of various memory devices, such as 256kb×1, 256kb×4, 1Mb×1, 4Mb×1 or 1Mb×4, with their differing numbers of address inputs.

The other input to the OR gate 600 is inverted and is connected to the output of a NOR gate 604 which has three inputs. The first input is connected to the output of an AND gate 606, whose inputs are the MXREF signal, which is the refresh signal from the host bus 44 and indicates that a refresh cycle is occurring and therefore the refresh addresses should be supplied, and the REFAD<10-0> signals which correspond to the bits 2-12 of the incoming address bus and are the refresh addresses. The second input of the NOR gate 604 is connected to the output of a 2 input AND gate 608 whose inputs are the MXRAD signal, which indicates that the multiplexer should be supplying the row addresses, and the RAD<10-0> or row address signals, which correspond to the bit positions 23, 21 and 19-11 of the incoming address bus. The final input to the NOR gate 604 is connected to the output of an AND gate 610 which has as its inputs the MXCADW signal, which indicates that this is a write operation column address to provided, and the CADW<10-0> signals, which are an intermittently latched version of the CADR<10-0>* signals. This intermittent latching, in combination with the latching of the data by the data buffer 60, is provided so that the control of the host bus 44 can be released in zero wait states, the cycle terminating earlier than otherwise possible. The CADW<10-0> signals are produced by the noninverted output of a series of eleven multiplexed flip-flops 612. The clocking signal is the CLK signal, while the inverted output of the flip-flop 612 is connected to the inverted D1 input. The inverted D0 input is connected to the CADR<10-0>* signals to provide the column addressing lines necessary. The select input to the multiplexed flip-flop 612 is provided by the CADWDIS or column address write disable signal, which enables a latching effect at the state of interest during write cycles. For that one particular state of interest the latching effect applies and the CADR<10-0>* signals are not passed through the flip-flop 612.

The CADWDIS signal is produced as the noninverting output of a D-type flip-flop 620 (FIG. 11). The inverted set input to the flip-flop 620 is connected to the RESET* signal and the clocking input is connected to the CLK signal. The inverted input to the flip-flop 620 is connected to the output of a 2 input NAND gate 622, one of whose inputs is connected to the output of a 3 input OR gate 624. One input to the OR gate 624 is the CADWDIS signal while the other inputs indicate that the next state of the state machine will be state PL or state PN. The second input of the NAND gate 622 is provided by the output of a two input NOR gate 626 whose inputs indicate that the state of the state machine is state PL or state PQ. Thus the CADWDIS signal is high only during states PL or PQ, with the addresses then being latched during states PM or PN.

Figure 15:
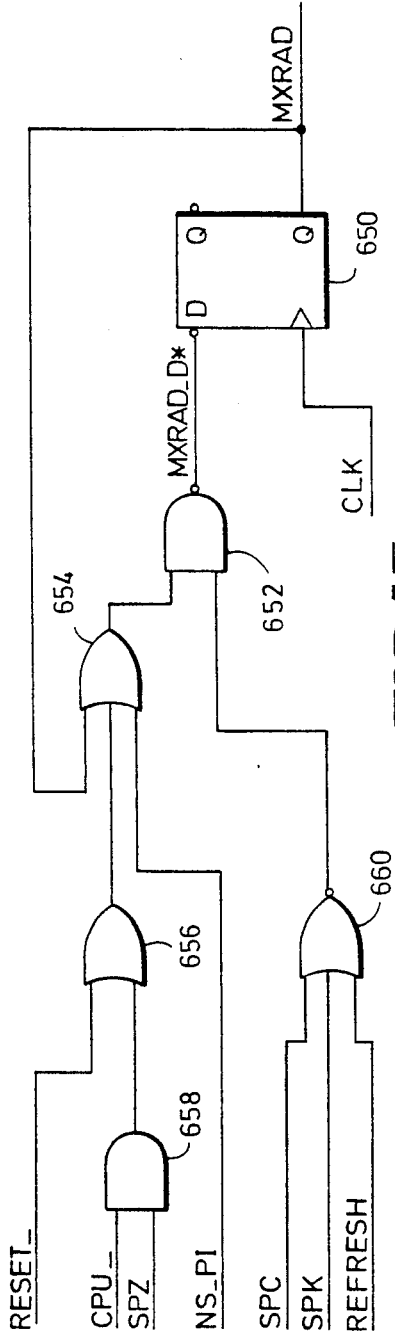

The row address multiplexing selection signal MXRAD is produced as the noninverting output of a D-type flip-flop 650 (FIG. 15). The clocking input to the flip-flop 650 is provided by the CLK signal. The inverted D input of the flip-flop 650 is connected to the MXRAD_D* signal which is produced by the output of a 2 input NAND gate 652. One input to the NAND gate 652 is connected to the output of a 3 input OR gate 654, one of whose inputs is the MXRAD signal. The second input to the OR gate 654 is a signal indicating that the next state of the state machine is state PI, while a third input to the OR gate 654 is the output of a 2 input OR gate 656. One input to the OR gate 656 is the RESET signal, while the other input is connected to the output of a 2 input AND gate 658 whose inputs are the CPU signal and a signal indicating that the next state of the state machine is state PZ. The second input to the NAND gate 652 is the output of a 3 input NOR gate 660, whose input signals indicate that the state machine is in state PC or state PK or that a refresh cycle is present. Thus the MXRAD signal is high during reset to set up for an initial cycle or during states PI, PJ, PB, PC and PK for page miss cycles.

The MXCADR* signal is produced as the inverting output of a D-type flip-flop 664 whose clocking signal is connected to the CLK signal. The inverted D input to the flip-flop 664 is connected to the output of a 2 input NAND gate 666. One of the inputs to the NAND gate 666 is connected to the output of a 2 input OR gate 668, one of whose inputs is a signal that indicates that the next state of the state machine is state PD. The second input of the OR gate 668 is connected to the output of a 3 input OR gate 670, whose inputs are connected to the MXCADR signal and to signals indicating that the next state of the state machine is state PX or that the state is state PQ. The second input of the NAND gate 666 is connected to the output to a 4 input NOR gate 672. One input of the NOR gate 672 is connected to the RESET signal. The second input to the NOR gate 672 is the output of an inverter 676 whose input is connected to the output of the NAND gate 580. The third input to the NOR gate 672 is a signal indicating that the state machine is in state PN. The fourth input to the NOR gate 672 is connected to the output of a 2 input AND gate 678. One input to the AND gate 678 is connected to the output of a 2 input NAND gate 680, whose inputs are the HIT signal and the HW-R* signal. The second input to the AND gate 678 is inverted and is connected to the output of a 2 input NAND gate 682. One of the inputs to the NAND gate 682 is the ADS signal, while the other input is connected to the output of a 3 input OR gate 684. The three inputs to the OR gate 684 are signals indicating that the state machine is in state PH or state PM and the output of NAND gate 578. Thus the MXCADR* signal is low during states PD, PE, PF, PG and PH and during PX idle states after read operations.

The MXCADW signal is produced as the noninverting output of a D-type flip-flop 690 whose clocking input is connected to the CLK signal. The inverted input of the flip-flop 690 is connected to the output of a 2 input NAND gate 692. One input to the NAND gate 692 is connected to the output of a 3 input OR gate 694, one of whose inputs is connected to a signal that indicates that the next state of the state machine is state PL. The second input of the OR gate 694 is connected to the MXCADW signal. The third input of the OR gate 694 is connected to a signal which indicates that the state machine is in state PN. The other input of the NAND gate 692 is connected to the output of a 4 input NOR gate 698. One input to NOR gate 698 is connected to RESET signal. The second input of the NOR gate 698 is connected to a signal which indicates that the state machine is in state PQ. The third input of the NOR gate 698 is connected to the output of a 2 input AND gate 704 whose inputs are signals indicating that the state machine is in state PM and the HIT.ADS* signal. The fourt input of the NOR gate 698 is connected to the output of a 2 input AND gate 706, whose inputs are signals representing that the state machine is in state PM and the HW-R* signal. Thus the MXCADW signal is high during states PL, PM, PO, PP, PQ and state PK following a state PM.

The foregoing disclosure and description of the invention are illustrative and explanatory thereof, and various changes in the size, shape, materials, components, circuitry, wiring connections and contacts, as well as in the details of the illustrated circuitry and construction and method of operation may be made without departing from the spirit of the invention.

We claim:

1. A computer system, comprising:
   a processor having address, data and control signals and using a clock cycle;
   a cache controller having address and control signals;
   a first bus formed of said address data and control signals of said processor and said address and control signals of said cache controller, said first bus connecting said processor and said cache controller;
   a second bus having address, data and control signals;
   means controlled by signals from said cache controller for coupling said address, data and control signals of said first bus and said second bus, wherein said address and control signals are provided to said second bus from said first bus at least one clock cycle after being provided by said processor to said first bus;
   page mode dynamic random access memory;
   a memory controller having a memory page hit input and coupled to said second bus and said memory for controlling operation of said memory and providing an indication of memory operation completion to said second bus; and
   means connected to said address signals in said first bus needed to define a page in said page mode dynamic random access memory for detecting a memory page hit, wherein said means for detecting a memory page hit is separate from said memory controller and provides a signal to said memory controller memory page hit input.

2. The computer system of claim 1,
   wherein said means for detecting a memory page hit includes a storage means for storing address values of a memory cycle, and
   comparator means for comparing said stored address values and current address values.

3. The computer system of claim 2, wherein said storage means is at least partially enables by a signal provided by said memory controller for control of said memory.

4. The computer system of claim 3, wherein said storage means is at least partially enabled by a signal from said cache controller used for controlling said means for coupling said first bus and said second bus.

5. The computer system of claim 1, further comprising:
   a second processor having address, data and control signals and using a clock cycle;
   a second cache controller having address and control signals;
   a third bus formed of said address, data and control signals for said second processor and said address and control signals of said second cache controller, said third bus connecting said second processor and said second cache controller;
   means controller by signals from said second cache controller for coupling said address, data and control signals of said third bus and said second bus, wherein said address and control signals are provided to said second bus from said third bus at least one clock cycle after being provided by said second processor to said third bus; and
   second means connected to said address and control signals need to define a page in said page mode dynamic random access memory in said third bus for detecting a memory page hit, wherein said second means for detecting a memory page hit is separate from said memory controller and provides a signal to said memory controller memory page hit input, and
   wherein said means for detecting a memory page hit and said second means for detecting a memory page hit each provide said signal to the same memory page hit input of said memory controller.

6. A computer system of claim 5, wherein both of said means for detecting a memory page hit and said second means for detecting a memory page hit include means for disabling providing said signal when said respective processor does not have access to said second bus.

7. The computer system of claim 1, wherein said memory controller includes means for disabling utilization of said signal from said means for detecting a memory page hit during a first cycle after said processor can access said memory via said second bus.

8. A computer system, comprising:
   a bus having address, data and control signals, the presentation of which define a plurality of memory cycles;
   page mode dynamic random access memory; and
   a memory controller couples to said bus and to said memory for controlling operation of said memory, wherein said memory controller is separate from said mode dynamic random access memory and includes:

means for providing row address values to said memory;

means for providing column address values to said memory, wherein said column address values are latched during memory write cycles;

means for coupling data from said bus to said memory, wherein said data is latched during memory write cycles; and means for indicating completion of a memory write cycle wherein said indication is given at a time such that the address and data value on said bus will be removed from said bus before a time to allow completion of the memory cycle by said memory, and wherein said means for providing column address values and said data coupling means latch said column address values and said data values before they are removed from said bus.

9. The computer system of claim 8, wherein said memory controller further includes: means for providing refresh address values to said memory.

10. The computer system of claim 8, wherein said memory controller provides only column addresses to said memory when said memory cycle utilizes the same row addresses as the previous memory cycle.

11. A computer system, comprising:
a processor having address, data and control signals and using a clock cycle;
a cache controller having address and control signals;
a first bus formed of said address data and control signals of said processor and said address and control signals of said cache controller, said first bus connecting said processor and said cache controller;
a second bus having address, data and control signals; which define a plurality of memory cycles;
means controlled by signals from said cache controller for coupling said address, data and control signals of said first bus and said second bus, wherein said address and control signals are provided to said second bus from said first bus at least one clock cycle after being provided by said processor to said first bus;
page mode dynamic random access memory;
a memory controller having a memory page hit input and coupled to said second bus and said memory for controlling operation of said memory, wherein said memory controller is separate from said page mode dynamic random access memory and includes:
means for providing row address values to said memory;
means for providing column address values to said memory, wherein said column address values are latched during memory write cycles; and
means for coupling data from said second bus to said memory, wherein said data is latched during memory write cycles; and
means connected to said address signals in said first bus needed to define a page in said page mode dynamic random access memory for detecting a memory page hit, wherein said means for detecting a memory page hit is separate from said memory controller and provides a signal to said memory controller memory page hit input.

12. The computer system of claim 11, wherein said means for detecting a memory page hit includes a storage means for storing address values of a memory cycle, and comparator means for comparing said stored address values and current address values.

13. The computer system of claim 12, wherein said storage means is at least partially enabled by a signal provided by said memory controller for control of said memory.

14. The computer system of claim 13, wherein said storage means is at least partially enabled by a signal from said cache controller used for controlling said means for coupling said first bus and said second bus.

15. The computer of claim 11, further comprising:
a second processor having address, data and control signals and using a clock cycle;
a second cache controller having address and control signals;
a third bus formed of said address, data and control signals of said second processor and said address and control signals of said second cache controller, said third bus connecting said second processor and said second cache controller;
means controlled by signals from said second cache controller for coupling said address, data and control signals of said third bus and said second bus, wherein said address and control signals are provided to said second bus from said third bus at least one clock cycle after being provided by said second processor to said third bus; and
means connected to said address signals and control signals needed to define a page in said page mode dynamic random access memory in said third bus for detecting a memory page hit, wherein said second means for detecting a memory page hit is separate from said memory controller and provides a signal to said memory controller memory page hit input, and
wherein said means for detecting a memory page hit and said second means for detecting a memory page hit each provide said signal to the same memory page hit input of said memory controller.

16. A computer system of claim 15, wherein both of said means for detecting a memory page hit and said second means for detecting a memory page hit including means for disabling providing said signal when said respective processor does not have access to said second bus.

17. The computer system of claim 11, wherein said memory controller includes means for disabling utilization of said signal from said means for detecting a memory page hit during a first cycle after said processor can access said memory via said second bus.

18. The computer system of claim 11, wherein said memory controller further includes:
means for indicating completion of a memory write cycle wherein said indication is given at a time such that the address values and data values on said second bus will be removed from said second bus before a time to allow completion of the memory cycle by said memory, and
wherein said means for providing column address values and said data coupling means latch said column address values and said data values before they are removed from said bus.

19. The computer system of claim 18, wherein said memory controller further includes:
means for providing refresh address values to said memory.

20. The computer system of claim 18, wherein said memory controller provides only column address values to said memory when said memory cycle utilizes the same row address values as the previous memory cycle.

* * * * *

UNITED STATES PATENT AND TRADEMARK OFFICE
CERTIFICATE OF CORRECTION

PATENT NO. : 5,303,364
DATED : APRIL 12, 1994
INVENTOR(S) : DALE J. MAYER, ET AL.

It is certified that error appears in the above-identified patent and that said Letters Patent is hereby corrected as shown below:

In col. 23, line 47, after "address" please insert --,--.

In col. 24, line 12, please replace "enables" with --enabled--.

In col. 24, line 26, please replace "for" with --of--.

In col. 24, line 30, please replace "controller" with --controlled--.

In col. 24, line 49, please replace "A" with --The--.

In col. 24, line 64, please replace "couples" with --coupled--.

In col. 24, line 67, after "said" please insert --page--.

In col. 25, line 29, after "address" please insert --,--.

In col. 25, line 34, after "signals" please delete ";".

In col. 25, line 45, after "second bus and" please insert --to--.

UNITED STATES PATENT AND TRADEMARK OFFICE
CERTIFICATE OF CORRECTION

PATENT NO. : 5,303,364
DATED : April 12, 1994
INVENTOR(S) : Dale J. Mayer

It is certified that error appears in the above-indentified patent and that said Letters Patent is hereby corrected as shown below:

In col. 26, line 27, before "means" please insert --second--.

In col. 26, line 59, before "bus" please insert --second--.

Signed and Sealed this

Sixteenth Day of August, 1994

Attest:

BRUCE LEHMAN

Attesting Officer     Commissioner of Patents and Trademarks